US012669611B2

(12) United States Patent
Calpe-Maravilla et al.

(10) Patent No.: US 12,669,611 B2
(45) Date of Patent: Jun. 30, 2026

(54) CONTINUOUS WAVE TIME OF FLIGHT SYSTEM

(71) Applicant: Analog Devices International Unlimited Company, Limerick (IE)

(72) Inventors: Javier Calpe-Maravilla, Algemesi (ES); Filiberto Pla, Limerick (IE); Jonathan Hurwitz, Limerick (IE); Nicolas Le Dortz, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 872 days.

(21) Appl. No.: 17/937,311

(22) Filed: Sep. 30, 2022

(65) Prior Publication Data

US 2024/0111055 A1    Apr. 4, 2024

(51) Int. Cl.
*G01C 3/08* (2006.01)
*G01S 17/34* (2020.01)
*G01S 17/36* (2006.01)
*G01S 17/894* (2020.01)

(52) U.S. Cl.
CPC ............ *G01S 17/894* (2020.01); *G01S 17/34* (2020.01); *G01S 17/36* (2013.01)

(58) Field of Classification Search
CPC ......... G01S 17/894; G01S 17/34; G01S 17/36
See application file for complete search history.

(56) References Cited

U.S. PATENT DOCUMENTS

| | | | | |
|---|---|---|---|---|
| 10,681,338 B1* | 6/2020 | Chen | .................... | H04N 13/296 |
| 2021/0160477 A1* | 5/2021 | Oh | ........................ | H04N 13/239 |
| 2021/0173085 A1* | 6/2021 | Park | ......................... | G01S 7/48 |
| 2023/0266473 A1* | 8/2023 | Loot | .................... | G01S 17/931 |
| | | | | 356/21 |

FOREIGN PATENT DOCUMENTS

| | | | | | |
|---|---|---|---|---|---|
| CN | 111708039 A | * | 9/2002 | ............. | G01B 11/22 |
| CN | 207909195 U | * | 9/2018 | | |
| WO | 2021078812 A1 | | 4/2021 | | |

OTHER PUBLICATIONS

Everett, "Survey of Collision Avoidance and Ranging Sensors for Mobile Robots," Robotics and Autonomous Systems, May 1, 1989, vol. 58, No. 1, pp. 5-67.
Extended European Search Report in EP23198624.1, mailed Feb. 16, 2024, 9 pages.

* cited by examiner

*Primary Examiner* — Mark Hellner
(74) *Attorney, Agent, or Firm* — ArentFox Schiff LLP

(57) ABSTRACT

There is provided continuous wave time of flight, CW-ToF, camera system comprising: one or more lasers for outputting laser light; one or more imaging sensors, the one or more image sensors each comprising a plurality of imaging pixels for accumulating charge based on incident light comprising reflected laser light off a first surface of an object; and a distance determination system coupled to the one or more imaging sensors.

20 Claims, 9 Drawing Sheets

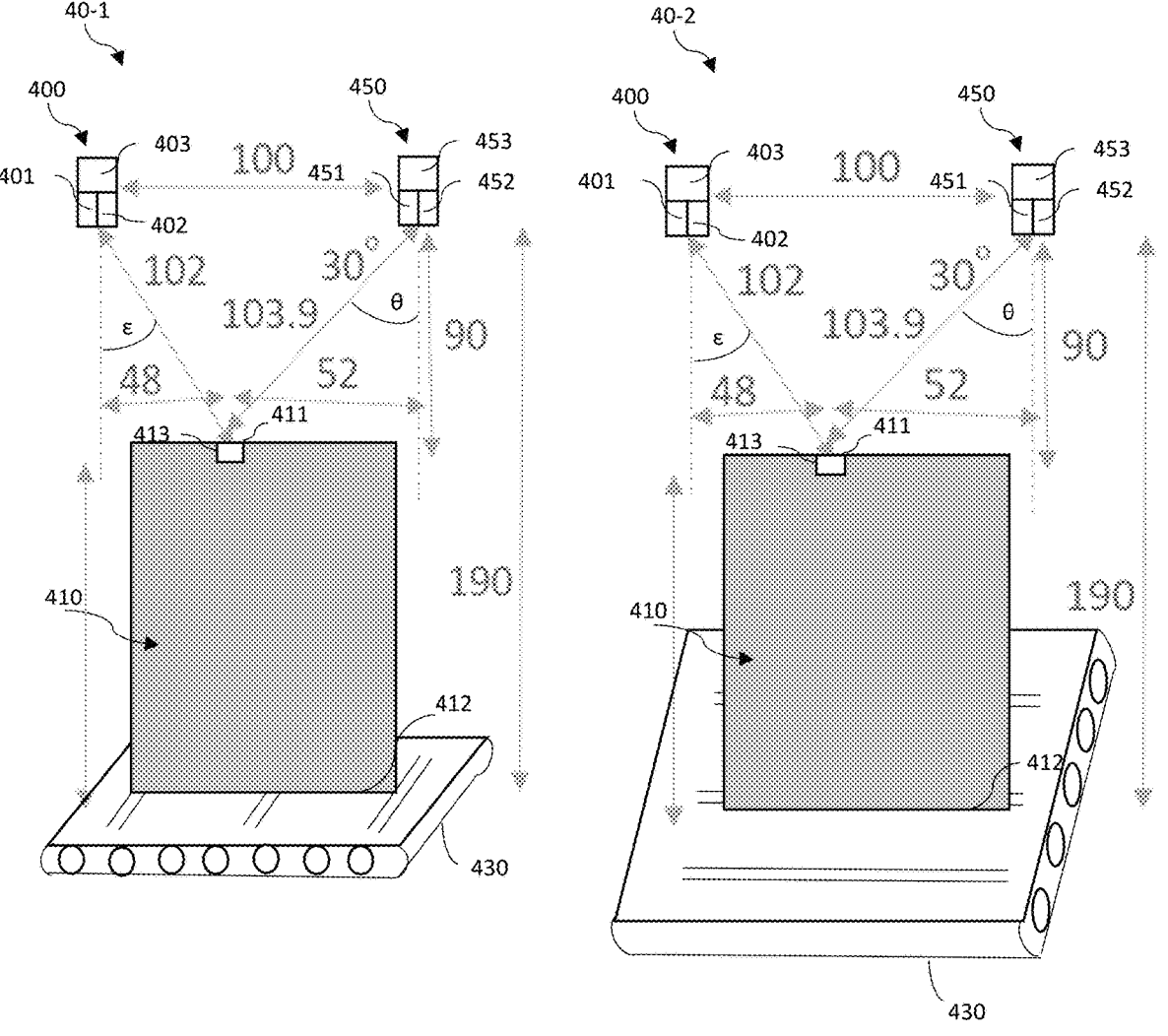
FIG. 4A                                    FIG. 4B

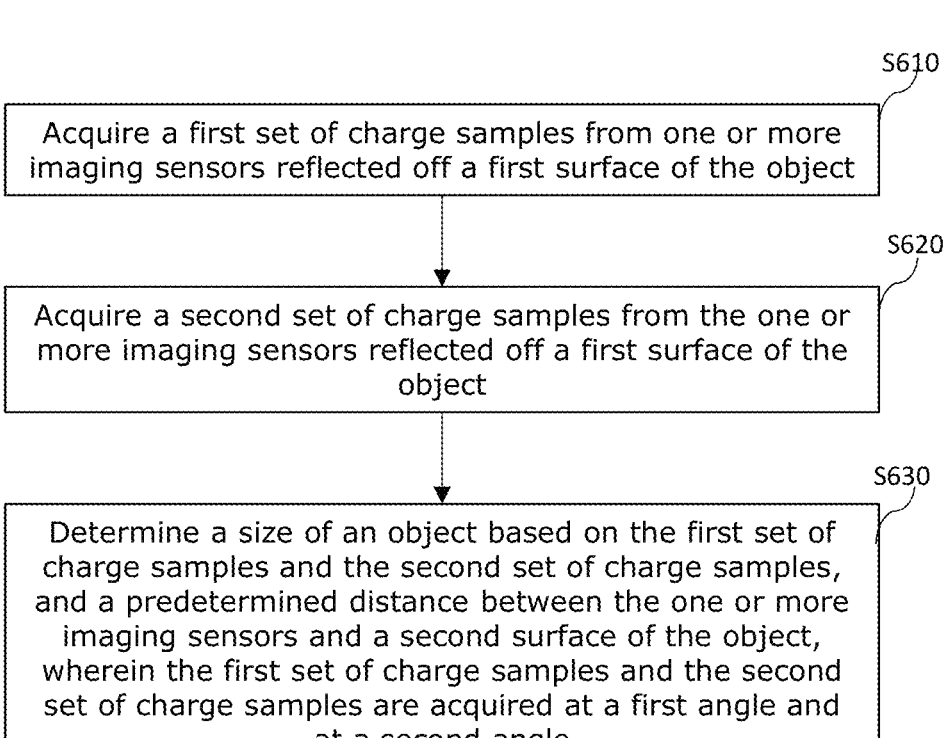

S610

Acquire a first set of charge samples from one or more imaging sensors reflected off a first surface of the object

S620

Acquire a second set of charge samples from the one or more imaging sensors reflected off a first surface of the object

S630

Determine a size of an object based on the first set of charge samples and the second set of charge samples, and a predetermined distance between the one or more imaging sensors and a second surface of the object, wherein the first set of charge samples and the second set of charge samples are acquired at a first angle and at a second angle

FIG. 6

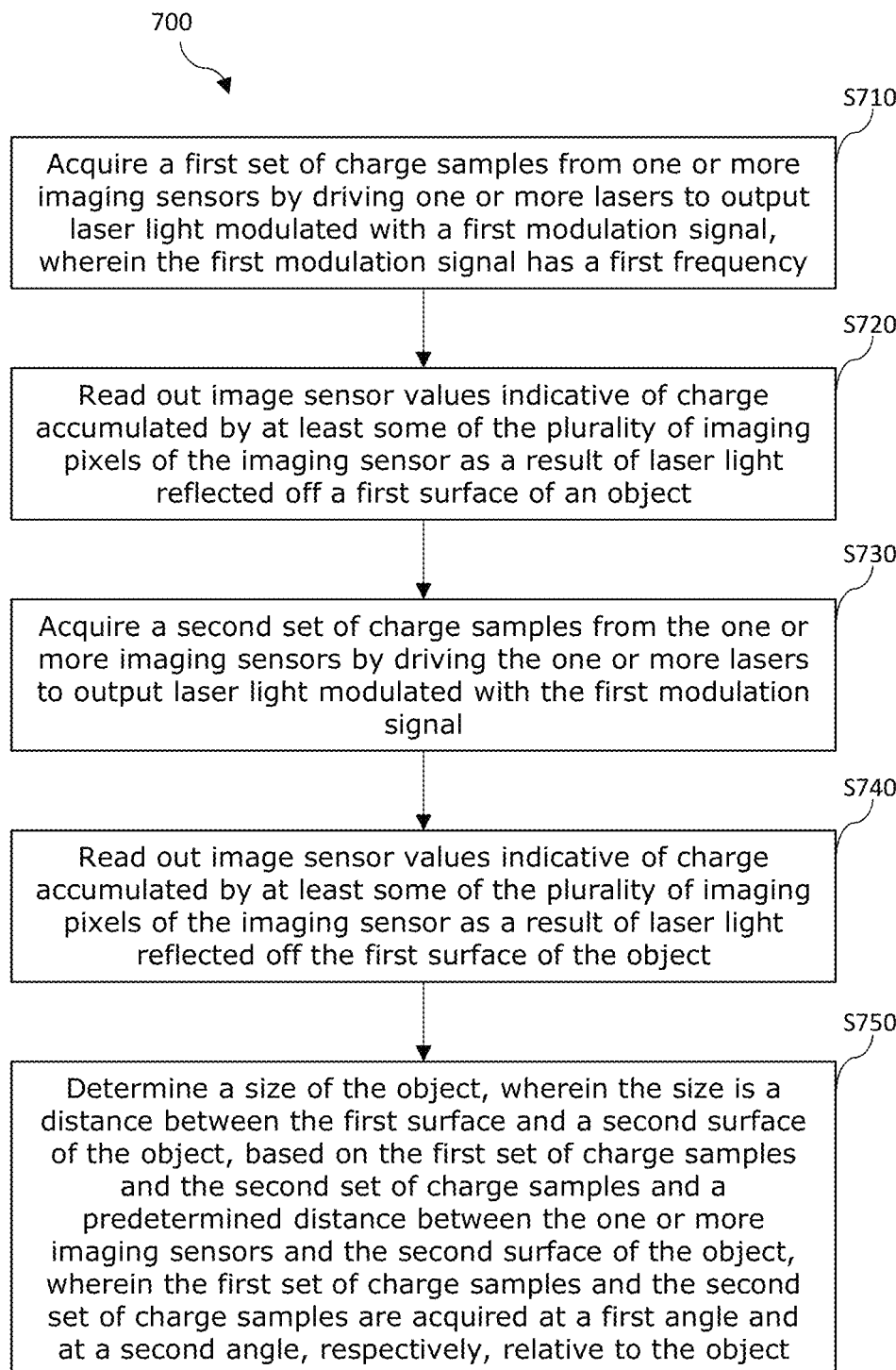

700

S710

Acquire a first set of charge samples from one or more imaging sensors by driving one or more lasers to output laser light modulated with a first modulation signal, wherein the first modulation signal has a first frequency

S720

Read out image sensor values indicative of charge accumulated by at least some of the plurality of imaging pixels of the imaging sensor as a result of laser light reflected off a first surface of an object

S730

Acquire a second set of charge samples from the one or more imaging sensors by driving the one or more lasers to output laser light modulated with the first modulation signal

S740

Read out image sensor values indicative of charge accumulated by at least some of the plurality of imaging pixels of the imaging sensor as a result of laser light reflected off the first surface of the object

S750

Determine a size of the object, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the object

FIG. 7

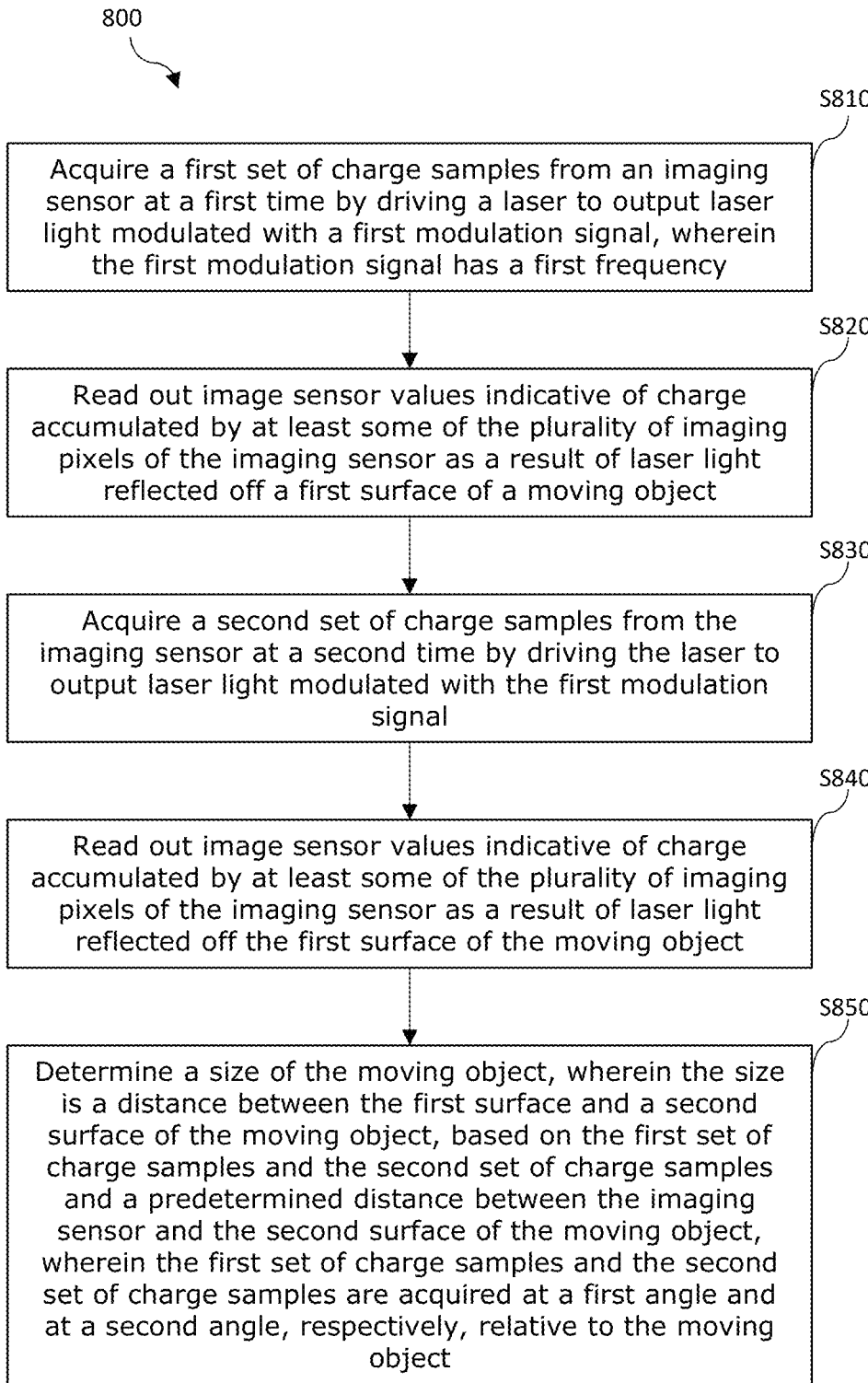

800

S810

Acquire a first set of charge samples from an imaging sensor at a first time by driving a laser to output laser light modulated with a first modulation signal, wherein the first modulation signal has a first frequency

S820

Read out image sensor values indicative of charge accumulated by at least some of the plurality of imaging pixels of the imaging sensor as a result of laser light reflected off a first surface of a moving object

S830

Acquire a second set of charge samples from the imaging sensor at a second time by driving the laser to output laser light modulated with the first modulation signal

S840

Read out image sensor values indicative of charge accumulated by at least some of the plurality of imaging pixels of the imaging sensor as a result of laser light reflected off the first surface of the moving object

S850

Determine a size of the moving object, wherein the size is a distance between the first surface and a second surface of the moving object, based on the first set of charge samples and the second set of charge samples and a predetermined distance between the imaging sensor and the second surface of the moving object, wherein the first set of charge samples and the second set of charge samples are acquired at a first angle and at a second angle, respectively, relative to the moving object

FIG. 8

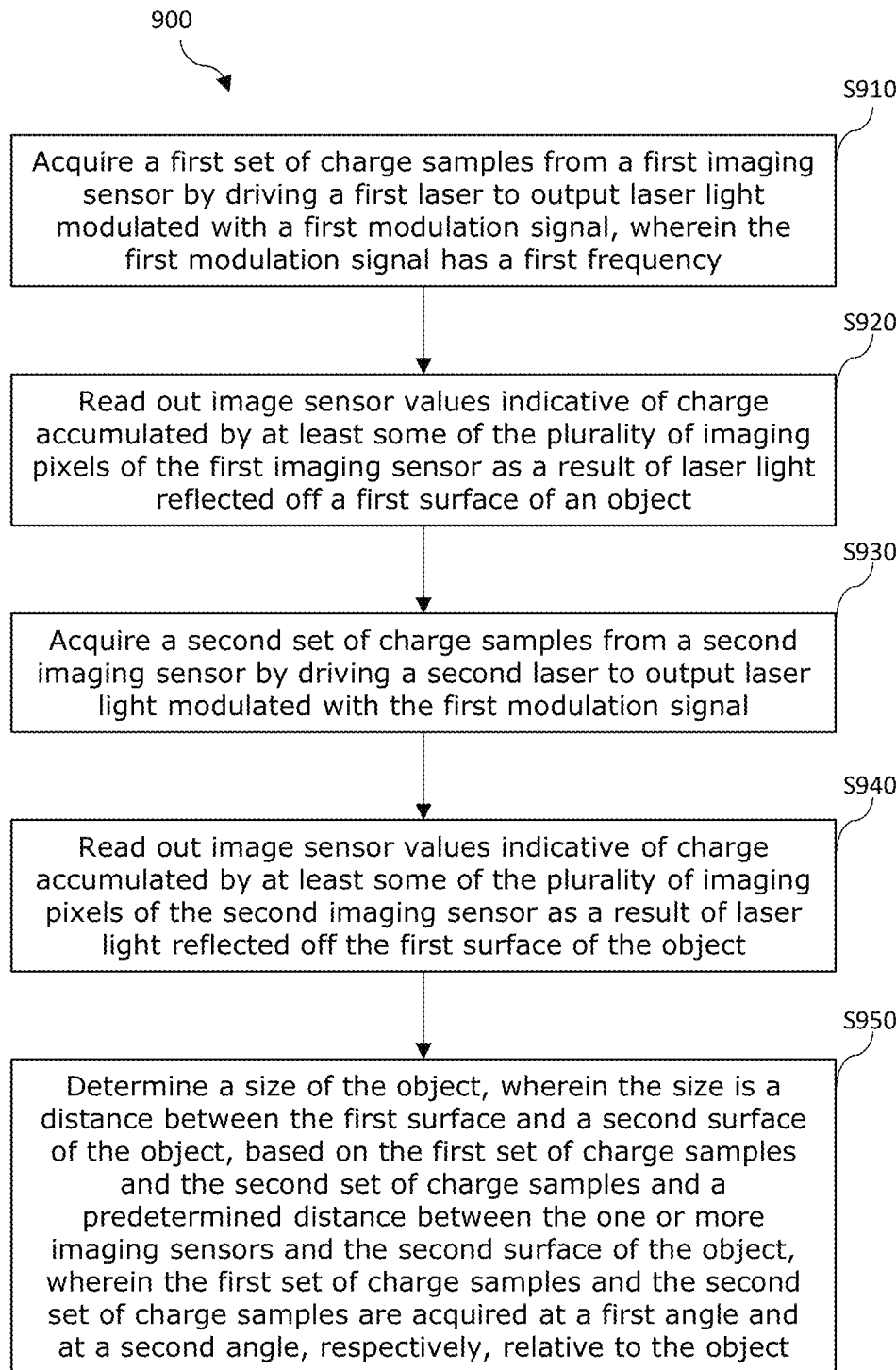

900

S910

Acquire a first set of charge samples from a first imaging sensor by driving a first laser to output laser light modulated with a first modulation signal, wherein the first modulation signal has a first frequency

S920

Read out image sensor values indicative of charge accumulated by at least some of the plurality of imaging pixels of the first imaging sensor as a result of laser light reflected off a first surface of an object

S930

Acquire a second set of charge samples from a second imaging sensor by driving a second laser to output laser light modulated with the first modulation signal

S940

Read out image sensor values indicative of charge accumulated by at least some of the plurality of imaging pixels of the second imaging sensor as a result of laser light reflected off the first surface of the object

S950

Determine a size of the object, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the object

FIG. 9

CONTINUOUS WAVE TIME OF FLIGHT SYSTEM

FIELD

This application relates to a continuous wave time of flight system and, in particular but not exclusively, to a continuous wave time of flight system that uses a single modulation frequency for determining distance to a moving object.

BACKGROUND

Time-of-flight (ToF) camera systems are range imaging systems that resolve the distance between the camera and an object by measuring the round trip of light emitted from the ToF camera system. The systems typically comprise a light source (such as a laser or LED), a light source driver to control the emission of light from the light source, an image sensor to image light reflected by the subject, an image sensor driver to control the operation of the image sensor, optics to shape the light emitted from the light source and to focus light reflected by the object onto the image sensor, and a computation unit configured to determine the distance to the object based on the emitted light and the corresponding light reflection from the object.

In a Continuous Wave (CW) ToF camera system, multiple periods of a continuous light wave are emitted from the laser. The system is then configured to determine the distance to the imaged object based on a phase difference between the emitted light and the received reflected light. CW-ToF systems often modulate the emitted laser light with a first modulation signal and determine a first phase difference between the emitted light and reflected light, before modulating the emitted laser light with a second modulation signal and determine a further phase difference between the emitted light and reflected light. In general, two or three modulation frequencies are used. A depth map/depth frame can then be determined based on the phase differences for these multiple modulation frequencies. The various modulation signals have different frequencies so that the various phase differences can be used to resolve phase wrapping.

During the time that it takes to emit the laser light and read-off the charge stored on the image sensor after each light emission, it is possible that the object being imaged will have moved, which may cause inaccuracies and/or blurring in the generated image frame. Furthermore, when the information obtained from multiple modulation frequencies are combined in order to obtain a single depth map, the time taken for this process, i.e. the exposure plus readout time, may cause more inaccuracies and/or blurring in the generated image frame. Therefore, a faster CW-ToF camera system that can reduce inaccuracies and/or blurring in the generated image information is desirable.

SUMMARY OF THE DISCLOSURE

The present disclosure relates to a continuous wave time of flight system that uses a single modulation frequency but multiple captures, for example, at least two angles of capture, for determining distance to an object. By 'multiple captures' this could mean that the captures are taken of the same point of an object in different positions at least at two different time instances, or taken of the same point of an object from at least two different angles at the same time (for example, with different cameras), or taken from at least two points of an image of an object at the same time. The camera system is configured to emit laser light modulated with a first frequency and image light reflected by a first surface of an object in order to determine a first phase difference between the emitted and reflected light and, separately, emit laser light modulated with the same first frequency and images light reflected by the first surface of the object to determine a second phase difference between the emitted and reflected light. Importantly, the first and second captures are taken from different angles relative to the first surface of the object. The first set of charge samples and the second set of charge samples may be acquired from different perspectives of the object. The distance to the object is determined using the first and second phase differences. The system is arranged to operate faster for obtaining the first phase difference and the second phase difference compared with prior systems that utilise multiple modulation frequencies of the lasers in order to obtain multiple captures of the object since integration time is reduced during the phase unwrapping. This results in a faster CW-ToF camera system that can reduce inaccuracies and/or blurring in the generated image information, without any significant reduction in accuracy of imaging.

In a first aspect of the disclosure, there is provided a continuous wave time of flight, CW-ToF, camera system comprising: one or more lasers for outputting laser light; one or more imaging sensors, the one or more image sensors each comprising a plurality of imaging pixels for accumulating charge based on incident light comprising reflected laser light off a first surface of an object; and a distance determination system coupled to the one or more imaging sensors and configured to:

acquire a first set of charge samples from the one or more imaging sensors in respect of the object by:
      a) driving the one or more lasers to output laser light modulated with a first modulation signal, wherein the first modulation signal has a first frequency; and
      b) after step a, reading out image sensor values indicative of charge accumulated by at least some of the plurality of imaging pixels of the one or more imaging sensors;
   acquire a second set of charge samples from the one or more imaging sensors in respect of the object by:
      c) driving the one or more lasers to output laser light modulated with the first modulation signal; and
      d) after step c, reading out image sensor values indicative of charge accumulated by at least some of the plurality of imaging pixels of the one or more imaging sensors; and
   determine a size of the object, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the first surface of the object.

In a second aspect of the disclosure, there is provided a method method of operating a continuous wave time of flight, CW-ToF, camera system for imaging a first surface of an object, the method comprising: acquiring a first set of charge samples from one or more imaging sensors in respect of the object by:
      a) driving one or more lasers to output laser light modulated with a first modulation signal, wherein the first modulation signal has a first frequency; and b) after step a, reading out image sensor values indicative of charge accumulated by at least some of the plurality of imaging pixels of the one or more imaging sensors as a result of laser light reflected off a first surface of the object;

acquiring a second set of charge samples from the one or more imaging sensors in respect of the object by:

c) driving the one or more lasers to output laser light modulated with the first modulation signal; and d) after step c, reading out image sensor values indicative of charge accumulated by at least some of the plurality of imaging pixels of the one or more imaging sensor as a result of laser light reflected off the first surface of the object; and determining, by a distance determination system coupled to the one or more imaging sensors, a size of the object, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the first surface of the object.

In a third aspect of the disclosure, there is provided a continuous wave time of flight, CW-ToF, camera system comprising: a laser for outputting laser light; an imaging sensor comprising a plurality of imaging pixels for accumulating charge based on incident light comprising reflected laser light off a first surface of a moving object; and a distance determination system coupled to the imaging sensor and configured to: acquire a first set of charge samples from the imaging sensor in respect of a moving object at a first time by:

a) driving the laser to output laser light modulated with a first modulation signal, wherein the first modulation signal has a first frequency; and b) after step a, reading out image sensor values indicative of charge accumulated by at least some of the plurality of imaging pixels of the imaging sensor;

acquire a second set of charge samples from the imaging sensor in respect of the moving object at a second time by:

c) driving the laser to output laser light modulated with the first modulation signal; and d) after step c, reading out image sensor values indicative of charge accumulated by at least some of the plurality of imaging pixels of the imaging sensor; and determine by a distance determination system coupled to the imaging sensor, a size of the moving object, wherein the size is a distance between the first surface and a second surface of the moving object, based on the first set of charge samples and the second set of charge samples and a predetermined distance between the imaging sensor and the second surface of the moving object, wherein the first set of charge samples and the second set of charge samples are acquired at a first angle and at a second angle, respectively, relative to the first surface of the moving object.

In a fourth aspect of the disclosure, there is provided a method of operating a continuous wave time of flight, CW-ToF, camera system for imaging a first surface of a moving object, the method comprising: acquiring a first set of charge samples from an imaging sensor in respect of the moving object at a first time by:

a) driving a laser to output laser light modulated with a first modulation signal, wherein the first modulation signal has a first frequency; and b) after step a, reading out image sensor values indicative of charge accumulated by at least some of the plurality of imaging pixels of the imaging sensor as a result of laser light reflected off the first surface of the object;

acquiring a second set of charge samples from the imaging sensor in respect of the moving object at a second time by:

c) driving the laser to output laser light modulated with the first modulation signal; and d) after step c, reading out image sensor values indicative of charge accumulated by at least some of the plurality of imaging pixels of the imaging sensor as a result of laser light reflected off the first surface of the moving object; and determining, by a distance determination system coupled to the imaging sensor, a size of the moving object, wherein the size is a distance between the first surface and a second surface of the moving object, based on the first set of charge samples and the second set of charge samples and a predetermined distance between the imaging sensor and the second surface of the moving object, wherein the first set of charge samples and the second set of charge samples are acquired at a first angle and at a second angle, respectively, relative to the first surface of the moving object.

In a fifth aspect of the disclosure, there is provided a continuous wave time of flight, CW-ToF, camera system comprising: at least a first and a second laser for outputting laser light; at least a first and a second imaging sensor, the at least two imaginge sensors each comprising a plurality of imaging pixels for accumulating charge based on incident light comprising reflected laser light off a first surface of an object; and a distance determination system coupled to the first and second imaging sensors and configured to:

acquire a first set of charge samples from the at least two imaging sensors in respect of the object at a first time by:

a) driving a first laser to output laser light modulated with a first modulation signal, wherein the first modulation signal has a first frequency; and b) after step a, reading out image sensor values indicative of charge accumulated by at least some of the plurality of imaging pixels of the first imaging sensor;

acquire a second set of charge samples from the at least two imaging sensors in respect of the object at the first time by:

c) driving a second laser to output laser light modulated with the first modulation signal; and d) after step c, reading out image sensor values indicative of charge accumulated by at least some of the plurality of imaging pixels of the second imaging sensor; and determine a size of the object, wherein the size is a distance between the first surface and a second surface of the object, based on the first set of charge samples and the second set of charge samples and a predetermined distance between the first and second imaging sensors and the second surface of the object, wherein the first set of charge samples and the second set of charge samples are acquired at a first angle and at a second angle, respectively, relative to the first surface of the object.

In a sixth aspect of the disclosure, there is provided a method of operating a continuous wave time of flight, CW-ToF, camera system for imaging a first surface of an object, the method comprising:

acquiring a first set of charge samples from a first imaging sensor in respect of the object by:

a) driving a first laser to output laser light modulated with a first modulation signal, wherein the first modulation signal has a first frequency; and b) after step a, reading out image sensor values indicative of charge accumulated by at least some of the plurality of imaging pixels of the first imaging sensor as a result of laser light reflected off first surface of the object;

acquiring a second set of charge samples from a second imaging sensor in respect of the object by:

c) driving a second laser to output laser light modulated with the first modulation signal; and d) after step c, reading out image sensor values indicative of charge accumulated by at least some of the plurality of imaging pixels of the second imaging sensor as a result of laser light reflected off the first surface of the object; and determining, by a distance determination system coupled to the first and second imaging sensors, a size of the object, wherein the size is a distance between the first surface and a second surface of the object, based on the first set of charge samples and the second set of charge samples and a predetermined distance between the first and second imaging sensors and the second surface of the object, wherein the first set of charge samples and the second set of charge samples are acquired at a first angle and at a second angle, respectively, relative to the first surface of the object.

In a seventh aspect of the disclosure, there is provided a continuous wave time of flight, CW-ToF, camera system comprising: a laser for outputting laser light; an imaging sensor, the imaging sensor comprising a plurality of imaging pixels for accumulating charge based on incident light comprising reflected laser light off a first surface of an object; and a distance determination system coupled to the imaging sensor and configured to:

acquire a first set of charge samples from a first subset of the plurality of imaging pixels of the imaging sensor in respect of the object at a first time by:

a) driving a first laser to output laser light modulated with a first modulation signal, wherein the first modulation signal has a first frequency; and b) after step a, reading out image sensor values indicative of charge accumulated by the first subset of the plurality of imaging pixels of the imaging sensor;

acquire a second set of charge samples from a second subset of the plurality of imaging pixels of the imaging sensor in respect of the object at the first time by:

c) driving a second laser to output laser light modulated with the first modulation signal; and d) after step c, reading out image sensor values indicative of charge accumulated by the second subset of imaging pixels of the imaging sensor; and determine a size of the object, wherein the size is a distance between the first surface and a second surface of the object, based on the first set of charge samples and the second set of charge samples and a predetermined distance between the imaging sensor and the second surface of the object, wherein the first set of charge samples and the second set of charge samples are acquired at a first angle and at a second angle, respectively, relative to the first surface of the object In an eight aspect of the disclosure, there is provided a method of operating a continuous wave time of flight, CW-ToF, camera system for imaging a first surface of an object, the method comprising: acquiring a first set of charge samples from a first subset of the plurality of imaging pixels of the imaging sensor in respect of the object at a first time by:

a) driving a first laser to output laser light modulated with a first modulation signal, wherein the first modulation signal has a first frequency; and b) after step a, reading out image sensor values indicative of charge accumulated by the first subset of the plurality of imaging pixels of the imaging sensor;

acquiring a second set of charge samples from a second subset of the plurality of imaging pixels of the imaging sensor in respect of the object at the first time by:

c) driving a second laser to output laser light modulated with the first modulation signal; and d) after step c, reading out image sensor values indicative of charge accumulated by the second subset of imaging pixels of the imaging sensor; and determining a size of the object, wherein the size is a distance between the first surface and a second surface of the object, based on the first set of charge samples and the second set of charge samples and a predetermined distance between the imaging sensor and the second surface of the object, wherein the first set of charge samples and the second set of charge samples are acquired at a first angle and at a second angle, respectively, relative to the first surface of the object.

FIGURES

Aspects of the present disclosure are described, by way of example only, with reference to the following drawings, in which:

FIG. 4A is a schematic representation of a CW-ToF imaging system in accordance with a further aspect of the present disclosure;

FIG. 4B is a schematic representation of a CW-ToF imaging system in accordance with a further aspect of the present disclosure;

FIG. 6 represents example method steps according to an aspect of the present disclosure;

FIG. 7 represents example method steps according to an aspect of the present disclosure;

FIG. 8 represents example method steps according to an aspect of the present disclosure; and FIG. 9 represents example method steps according to an aspect of the present disclosure.

DETAILED DESCRIPTION

Figure 1:
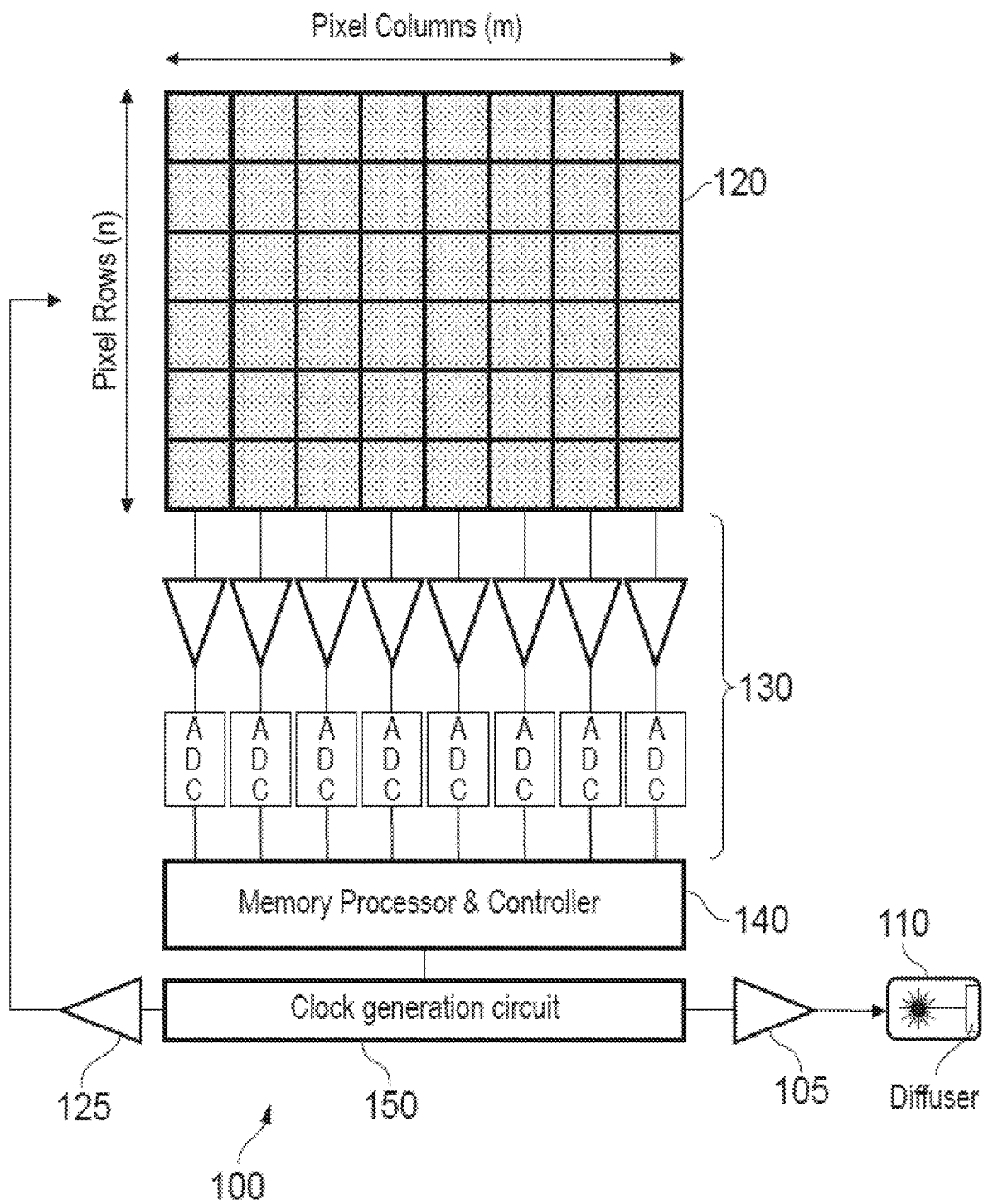
FIG. 1 is a schematic representation of a CW-ToF imaging system in accordance with an aspect of the present disclosure.

As described in the background section, CW-ToF camera systems are configured to modulate emitted laser light with a first frequency modulation signal and determine a first phase difference between the emitted light and reflected light, before modulating the emitted laser light with a second frequency modulation signal and determine a further phase difference between the emitted light and reflected light. Phase unwrapping can then be performed using the two determined phase differences and a depth map/depth frame can be determined. The present inventors have realised that inaccuracies and/or blurring in the generated image frame may be reduced by using a different phase unwrapping technique that does not rely on using two determined phase differences. Instead, the present inventors have recognised that using a single modulation frequency in the CW-ToF camera system can produce depth images with reduced inaccuracies and/or blurring in the generated image information since integration time may be reduced. The way in which the present disclosure achieves this effect and avoids the problem of depth aliasing due to phase wrapping is by obtaining depth information from more than one angle (or position) of the object to be imaged. In other words, distances to the object are estimated from each angle (or position) to the object and then phase unwrapping can be performed using the candidate distances, a size of the object may be determined and then an actual distance to the object may be determined.

One way in which to use the technique of the present disclosure on a moving object could be to use a single camera to capture depth information of the moving object at different times i.e. when it is in at least two positions relative to the camera, and combining information obtained at the at least two time instances. Another way in which to use the technique of the present disclosure on an object could be to use two cameras to capture depth information of the object at the same time from different angles i.e. when it is in at least two positions relative to the first and second cameras, and combining information obtained by the first and second cameras. Yet another way in which to use the technique of the present disclosure could be to use a camera to capture depth information of an object from at least two points of the same image taken at the same time, e.g. depth information taken from different pixels of the same image.

In each of the above cases, a single modulation frequency is used, thus avoiding wrapping effects that cause inaccuracies and/or blurring in the generated image frame, and instead using the fact that the moving object is captured in different positions or using more than one part of the image of a single capture in order to determine distance to the moving object. Consequently, the present inventors have developed a faster CW-ToF camera system that can reduce inaccuracies and/or blurring in the generated image information that still maintains an acceptable level of accuracy for many applications.

The present disclosure may be particularly relevant in several applications. For example, one application could be to image sizes and/or heights of objects on conveyor belt systems, in particular, objects moving on the conveyor belt system. Motion on conveyor belt systems is usually fairly well defined. For example, the motion could be substantially constant and linear. For conveyor belt applications, the present disclosure proposes techniques to allow obtaining range images from a single snapshot and avoid blurring by solving the wrapping in the distance using the fact that we have multiple captures of the object. The techniques of the present disclosure can also be extended to less well defined moving objects in applications such as moving robotics.

In one conveyor belt system example, a laser outputs laser light and an imaging sensor comprises a plurality of imaging pixels for accumulating charge based on incident light comprising reflected laser light off a first surface of an object. A distance determination system is coupled to the imaging sensor and it acquires two sets of charge samples from the image sensor. The first set of charge samples is acquired at a first time at a first angle relative to the first surface of the object by driving the laser at a first modulation frequency and then reading out image sensor values. The second set of charge samples is acquired at a second time at a second angle relative to the first surface of the object by driving the laser at the first modulation frequency and then reading out image sensor values. The first and second angles are different to one another since the object has moved between the first time and the second time. A size may be defined as a distance between the first surface and a second surface of the object. The size of the object is obtained based on the first set of charge samples and the second set of charge samples as well as a known or predetermined distance between the imaging sensor and the second surface of the object. Thus, size of the object is determined from the generated image information by the CW-ToF camera system faster than using multiple modulation frequencies and, consequently, inaccuracies and/or blurring in the generated image information can be reduced, by avoiding phase unwrapping.

In another conveyor belt system example, two lasers output laser light and two imaging sensors each comprise a plurality of imaging pixels for accumulating charge based on incident light comprising reflected laser light off a first surface of an object. Alternatively, one laser outputs laser light and two imaging sensors each comprise a plurality of imaging pixels for accumulating charge based on incident light comprising reflected laser light off a first surface of an object, the single laser and two imaging sensors being synchronized such that control signals may trigger the light output and captures. A distance determination system for each CW-ToF camera is coupled to the two imaging sensors, respectively, and they each acquire a sets of charge samples. The first set of charge samples is acquired by the first imaging sensor at a first angle relative to the first surface of the object by driving the first laser at a first modulation frequency and then reading out image sensor values. The second set of charge samples is acquired by the second imaging sensor at a second angle relative to the first surface of the object by driving the second laser at the first modulation frequency and then reading out image sensor values. The first and second angles are different to one another since the first and second imaging sensors are positioned in different locations relative to the object. A size may be defined as a distance between the first surface and a second surface of the object. The size of the object is obtained based on the first set of charge samples and the second set of charge samples as well as a known or predetermined relative location between the two imaging sensors and the second surface of the object. Thus, size of the object is determined from the generated image information by the CW-ToF camera system faster than using multiple modulation frequencies and, consequently, inaccuracies and/or blurring in the generated image information can be reduced, by avoiding phase unwrapping.

In yet another conveyor belt system example, a laser outputs laser light and an imaging sensor comprises a plurality of imaging pixels for accumulating charge based on incident light comprising reflected laser light off a first surface of an object. A distance determination system is coupled to the imaging sensor and it acquires two sets of charge samples from different pluralities of pixels of the image sensor. The first set of charge samples is acquired at a first time at a first angle relative to the first surface of the object by driving the laser at a first modulation frequency and then reading out image sensor values. The second set of charge samples is acquired at the first time at a second angle relative to the first surface of the object by driving the laser at the first modulation frequency and then reading out image sensor values. The first and second angles are different to one another since the pluralities of pixels are acquired from different points of the object. A size may be defined as a distance between the first surface and a second surface of the object. The size of the object is obtained based on the first set of charge samples and the second set of charge samples as well as a known or predetermined distance between the imaging sensor and the second surface of the object. Thus, size of the object is determined from the generated image information by the CW-ToF camera system faster than using multiple modulation frequencies and, consequently, inaccuracies and/or blurring in the generated image information can be reduced, by avoiding phase unwrapping.

FIG. 1 shows an example representation of a CW-ToF camera system 100. The system 100 comprises a laser 110 (which may be any suitable type of laser, for example a VCSEL) and a laser driver 105 configured to drive the laser 110 into light emission.

The system 100 also comprises an imaging sensor 120 that comprises a plurality (in this case m×n) of imaging pixels. A converter system 130 (comprising a plurality of amplifiers and ADCs) is coupled to the imaging sensor 120 for reading off image sensor values (for example, voltages) that are indicative of charge accumulated on the imaging pixels, and digitally converting the read off values, which are output to the memory processor & controller 140. The memory processor & controller 140 may be configured to determine depth frames (also referred to as depth maps), indicative of distance to the object being imaged, based on the received digital values indicative of charge accumulated on the imaging pixels. The memory processor & controller 140 may also be configured to determine active brightness frames (also referred to as 2D IR frames/images). Alternatively, the memory processor & controller 140 may be coupled to a processor via a data base (not shown in the figure) and output the acquired digital values for use by the processor in determining depth frames and/or 2D IR frames. The memory processor & controller 140 controls a clock generation circuit 150, which outputs timing signals for driving the laser 110 and for reading charge off the imaging sensor 120. The converter system 130, memory processor & controller 140 and clock generation circuit 150 may together be referred to as an image acquisition system, configured to determine one or more depth frames by controlling the laser 110 emission, controlling the image sensor 120 charge accumulation timing (via a buffer/amplifier 125), reading off the image sensor 120 and processing the resultant data.

Figure 2:
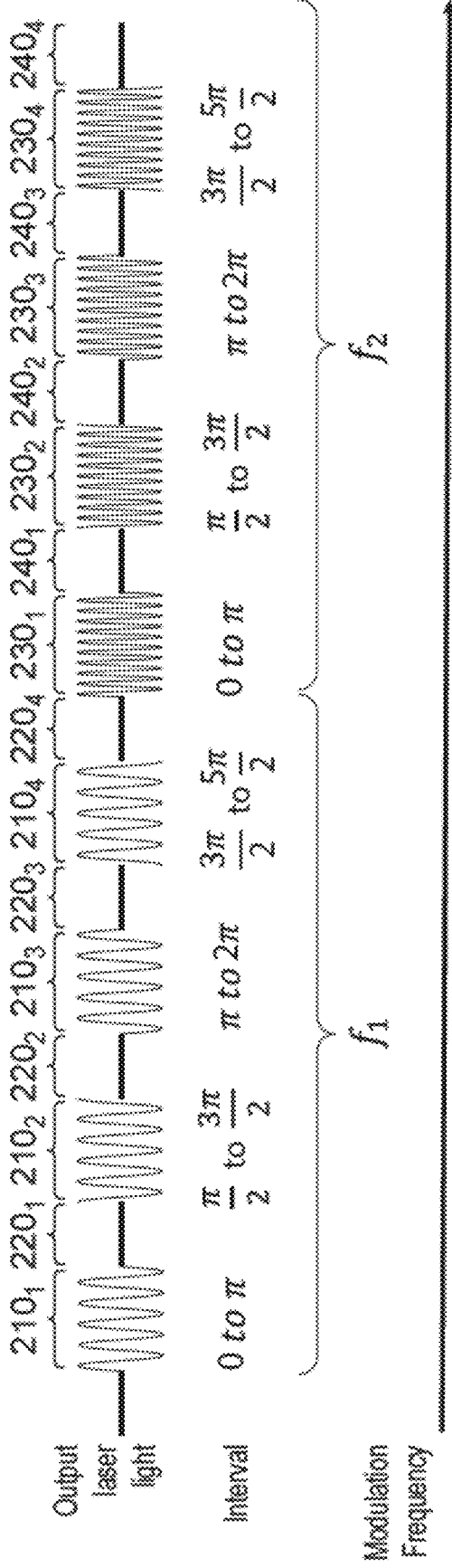
FIG. 2 is a schematic representation of how the CW-ToF imaging system of FIG. 1 may be operated to accumulate and readout charge from the imaging sensor.

FIG. 2 shows an example schematic diagram to help explain the operation of the system 100. The memory processor & controller 140 and clock generation circuit 150 control the laser 110 to output first laser light modulated by a first modulation signal having a first frequency $f_1$ for an accumulation period of time $210_1$. During this period of time, some of the first laser light reflected from the object will be incident on the imaging sensor 120. During the accumulation period of time $210_1$, the memory processor & controller 140 and clock generation circuit 150 also controls the imaging sensor 120 to accumulate charge based on the incident reflected first laser light for the first part/interval of the period/cycle of the first laser light (0° to 180°, or 0 to π).

For example, the imaging sensor 120 is controlled to "open its shutter" for charge accumulation at the times when the phase of the emitted first laser light is between 0° to 180°. This is so that the phase of the received first laser light relative to the emitted first laser light at a first interval of 0 to π may later be determined using the charge accumulated on the imaging sensor 120, for example by cross correlating the accumulated charge signal with the first modulation signal. In this example, accumulation takes place for half of the period/cycle of the first laser light, but may alternatively take place for any other suitable amount of time, for example for one quarter of the phase of the first laser light. The skilled person will readily understand how to control the accumulation timing of the imaging sensor 120 using control signals based on the timing of the laser modulation signal. As will be understood by the skilled person, if the image sensor 120 is a single ended pixel type, the pixels may be controlled to accumulate charge for this part/interval of the period and not accumulate any charge for the remainder of the period. If the image sensor 120 is a differential pixel type, the pixels may be controlled to accumulate charge for this part/interval of the period on one side of the pixel and accumulate charge on the other side of the pixel for the remainder of the period. This also applies to the other accumulation parts/intervals described later.

During a subsequent read out period of time $220_1$, the memory processor & controller 140 and clock generation circuit 150 control the first laser $110_1$ to cease emitting light and control readout image sensor values that are indicative of the charge accumulated in the imaging pixels of the imaging sensor 120. The nature of the readout values will depend on the technology of the imaging sensor 120. For example, if the imaging sensor is a CMOS sensor, voltage values may be readout, where each voltage value is dependent on the charge accumulated in an imaging pixel of the imaging sensor 120, such that the readout values are each indicative of charge accumulated in imaging pixels of the imaging sensor 120. In other sensor technologies, the nature of the readout values may be different, for example charge may be directly readout, or current, etc. For example, the imaging sensor 120 may be controlled to readout image sensor values from row-by-row using any standard readout process and circuitry well understood by the skilled person. In this way, a sample of charge accumulated by each imaging pixel during the period $210_1$ may be read off the imaging sensor 120, converted to a digital value and then stored by the memory processor & controller 140. The group of values, or data points, arrived at the conclusion of this process is referred to in this disclosure as a charge sample.

It will be appreciated that the accumulation period of time $210_1$ may last for multiple periods/cycles of the first modulation signal (as can be seen in FIG. 1) in order to accumulate sufficient reflected light to perform an accurate determination of the phase of the received reflected light relative to the first modulation signal, for the interval 0 to π of the first modulation signal.

During accumulation period of time $210_2$, the memory processor & controller 140 and clock generation circuit 150 again control the first laser $110_1$ to output first laser light modulated by the first modulation signal for an accumulation period of time $210_2$. This is very similar to the accumulation period $210_1$, except during accumulation period of time $210_2$ the memory processor & controller 140 and clock generation circuit 150 controls the imaging sensor 120 to accumulate charge for the second part/interval of the period/cycle of the first modulation signal (90° to 270°, or π/2 to 3π/2). The readout period $220_2$ is very similar to period $220_1$, except the obtained charge sample relates to a shifted or delayed interval of $\pi/2$ to $3\pi/2$ of the first modulation signal.

Accumulation period of time $210_3$ is very similar to the period $210_2$, except the memory processor & controller 140 and clock generation circuit 150 controls the imaging sensor 120 to accumulate charge for the third part/interval of the period/cycle of the first modulation signal (180° to 360°, or $\pi$ to $2\pi$). The readout period $220_3$ is very similar to period $220_2$, except the sampled charge data relates to a shifted or delayed interval of $\pi$ to $2\pi$ of the first modulation signal.

Finally, accumulation period of time $210_4$ is very similar to the period $210_3$, except the memory processor & controller 140 and clock generation circuit 150 also controls the imaging sensor 120 to accumulate charge based on the incident reflected first laser light for a fourth part/interval of the period/cycle of the first modulation signal (270° to 90°, or $3\pi/2$ to $\pi/2$). The readout period $220_4$ is very similar to period $220_3$, except the charge sample relates to a shifted or delayed interval of $3\pi/2$ to $\pi/2$ (or, put another, a shifted or delayed interval of $3\pi/2$ to $5\pi/2$).

It can be seen from the above that for each accumulation period $210_1$-$210_4$, the start timing of pixel accumulation timing relative to the laser modulation signal is shifted (i.e., the relative phase of the laser modulation signal and the pixel demodulation signal, which controls pixel accumulation timing, is shifted). This may be achieved either by adjusting the pixel demodulation signal or by adjusting the laser modulation signal. For example, the timing of the two signals may be set by a clock and for each of the accumulation periods $210_1$-$210_4$, either the laser modulation signal or the pixel demodulation signal may be incrementally delayed by $\pi/2$.

Whilst in this example each accumulation period $210_1$-$210_4$ lasts for 50% of the period of the laser modulation signal (i.e., for 180°), in an alternative, each accumulation period may be shorter, for example 60°, or 90°, or 120°, etc, with the start of each accumulation period relatively offset by 90° as explained above. After completing this, four samples of data (charge samples) have been acquired and stored in memory. They together may be referred to as a first set of charge samples. Immediately after the read out period $220_4$, or at some later time, a phase relationship between the first laser light and the received reflected light may be determined using the four charge samples (for example by performing a discrete Fourier transform (DFT) on the samples to find the real and imaginary parts of the fundamental frequency, and then determining the phase from the real and imaginary parts, as will be well understood by the skilled person). This may be performed by the image acquisition system, or the charge samples may be output from the distance determination system to an external processor via a data bus for the determination of the phase relationship. Optionally, active brightness (2D IR) may also be determined (either by the distance determination system or the external processor) for the reflected first laser light using the four samples (for example, by determining the magnitude of the fundamental frequency from the real and imaginary parts, as will be well understood by the skilled person).

Whilst in this example four samples of data are obtained by having four accumulation periods $210_1$-$210_4$, for some types of imaging pixel the same number of samples may be obtained from fewer accumulation periods. For example, if the imaging pixels are differential pixels, or two tap pixels, one half of each pixel may be readout for the sample relating to accumulation interval 0° to 180°, and the other half may be readout for accumulation interval 180° to 360°. Therefore, two samples may be obtained from a single accumulation period $210_1$ and readout $220_1$. Likewise, two samples for 90° to 270° and 270° to 450° may be obtained from a single accumulation period $210_2$ and readout $220_2$. In a further example, if four tap imaging pixels are used with the start of accumulation on each relatively offset by 90°, all four samples may be obtained from a single accumulation period and readout. However, even when two or more samples may be obtained for two or more different phase off-sets in a single accumulation period and readout, optionally multiple accumulation periods and readouts may still be performed, with each phase offset being moved around the available accumulation region of each imaging pixel for each successive accumulation periods, in order to correct for pixel imperfections. For example, for a four tap imaging pixel, there may be four accumulation periods and readouts with the phase offsets being successively moved around the four accumulation regions of each pixel, resulting in four samples for each phase offset, each sample being readout from a different accumulation region of the pixel, meaning that pixel imperfections can be corrected using the samples.

The skilled person will readily understand that using DFT to determine the phase relationship between the first laser light and the received reflected laser light, and to determine active brightness, is merely one example and that any other suitable alternative technique may be used. By way of brief explanation a further non-limiting example is now described.

The transmitted, modulated laser signal may be described by the following equation:

$$s(t) = A_s \sin(2\pi f t) + B_s$$

Where:
s(t)=optical power of emitted signal
f=laser modulation frequency
$A_s$=amplitude of the modulated emitted signal
$B_s$=offset of the modulated emitted signal
The signal received at the imaging sensor may be described by the following equation:

$$r(t) = \alpha(A_s \sin(2\pi f t + \Phi) + B_s) + B_{env}$$

$$\Phi = 2\pi f \Delta$$

$$\Delta = \frac{2d}{c}$$

Where:
r(t)=optical power of received signal
$\alpha$=attenuation factor of the received signal
$\phi$=phase shift
$B_{env}$=amplitude of background light
$\Delta$=time delay between emitted and received signals (i.e., time of flight)
d=distance to imaged object
c=speed of light
Accumulation timing of the imaging pixels may be controlled using a demodulation signal, $g(t-\tau)$, which is effectively a time delayed version of the illumination signal.

$$g(t-\tau) = A_g \sin(2\pi f(t-\tau)) + B_g$$

Where:
$\tau$=a variable delay, which can be set to achieve the phase delays/offsets between each accumulation period $210_1$-$210_4$ described above
$A_g$=amplitude of the demodulation signal
$B_g$=offset of the demodulation signal The imaging pixels of the imaging sensor effectively multiply the signals r(t) and g(t−τ). The resulting signal may be integrated by the imaging pixels of the imaging sensor to yield a cross correlation signal c(T):

$$c(T)=A\ sin(2\pi f(t-\tau))+B$$

By driving the imaging sensor to accumulate at different offsets during different accumulation periods, as described above, it is possible to measure correlation at different time offsets T (phase-offsets φ) 0, π/2, π, 3π/2:

$$c(\tau) = A\sin(2\pi f(t-\tau)) + B = A\sin(\Phi - \varphi) + B$$
$$c(\tau) = A(\sin(\Phi)\cos(-\varphi) + \cos(\Phi)\sin(-\varphi)) + B$$
$$c(0) = A1 = A(\sin(\Phi)) + B$$
$$c\left(\frac{\pi}{2}\right) = A2 = -A(\cos(\Phi)) + B$$
$$c(\pi) = A3 = -A(\sin(\Phi)) + B$$
$$c\left(\frac{3\pi}{2}\right) = A4 = A(\cos(\Phi)) + B$$

From these readings, it can be determined that the phase offset/time of flight can be found by:

$$\Phi = 2\pi f\Delta = \arctan\left(\frac{\sin(\Phi)}{\cos(\Phi)}\right) = \operatorname{atan}\left(\frac{A1 - A3}{A4 - A2}\right)$$

Therefore, a depth image or map can be determined using the four charge samples acquired from the image sensor.

An active brightness, or 2D IR, image/frame may also be determined by determining $\sqrt{(A4-A2)^2+(A1-A3)^2}$.

Subsequently, the process described earlier in relation to periods $210_1$-$210_4$ and $220_1$-$220_4$ may then be repeated in accumulation periods $230_1$-$230_4$ and read out periods $240_1$-$240_4$. These are the same as the accumulation periods $210_1$-$210_4$ and read out periods $220_1$-$220_4$, except rather than driving the laser $110_1$ to emit light modulated with the first modulation signal, the laser 110 is driven to emit light modulated with a second modulation signal. The second modulation signal has a second frequency $f_2$, which is higher than the first frequency $f_1$. As a result, four further samples of data (charge samples) are obtained and stored in memory. Based on these charge samples, a phase relationship between the second laser light and the received reflected light (and optionally also the active brightness for the reflected second laser light) may be determined either by the distance determination system or the external processor, for example using DFT or correlation function processes as described above.

Using the determined phase relationship between the first laser light and the received reflected light and the determined phase relationship between the second laser light and the received reflected light, phase unwrapping may be performed and a single depth image/frame determined by the memory processor & controller 140 (as will be understood by the skilled person). In this way, any phase wrapping issues can be resolved so that an accurate depth frame can be determined. This process may be repeated many times in order to generate a time series of depth frames, which may together form a video.

Optionally, a 2D IR frame may also be determined using the determined active brightness for the first laser light and/or the determined active brightness for the second laser light.

The inventors have recognised that the above described process for acquiring a first set of charge samples (which includes accumulation periods $210_1$-$210_4$ and read out periods $220_1$-$220_4$) and acquiring a second set of charge samples (which includes accumulation periods $230_1$-$230_4$ and read out periods $240_1$-$240_4$) takes a relatively large amount of time. For example, each accumulation period may last in the region of about 100 μs and each read out period may last in the region of about 3 ms, such that the entire process lasts in the region of 19 ms. During this time, the object being imaged may move relative to the camera system 100, such that the finally determined depth frame may have a blurred image of the object and/or have some inaccuracies. Furthermore, they have recognised the above described processes may require fairly significant energy consumption, which may be particularly significant if the system 100 is implemented within a battery operated device, such as a smartphone or tablet.

The present inventors have identified that using a single modulation frequency in the CW-ToF camera system can produce depth images with reduced inaccuracies and/or blurring in the generated image information since integration time may be reduced. The way in which the present disclosure achieves this effect is by obtaining depth information from more than one angle of the object to be imaged. In other words, distances to the object are estimated from each angle to the object and then phase unwrapping can be performed using the estimated distances and a distance to the object may be determined. Two specific examples of the present disclosure will now be described in detail in relation to FIGS. 3 and 4.

Figures 3A, 3B:
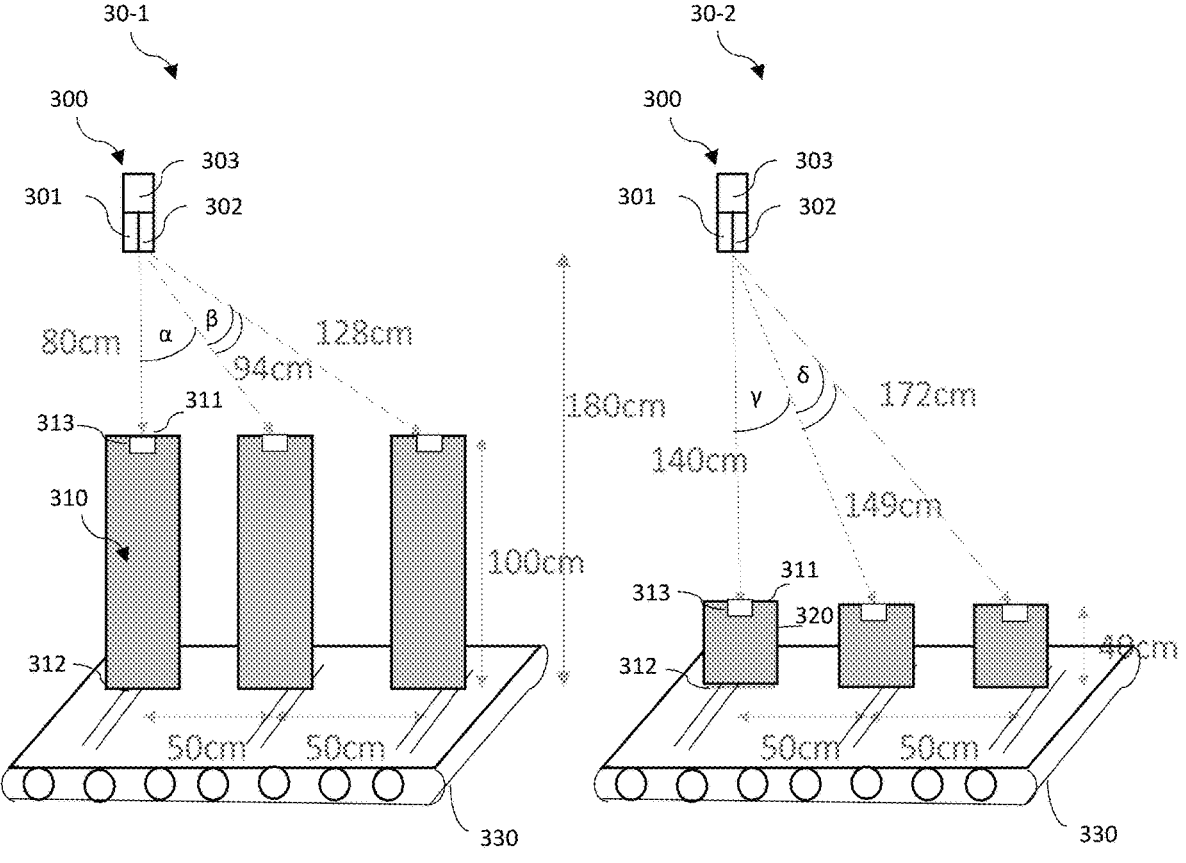
FIG. 3A is a schematic representation of a CW-ToF imaging system in accordance with a further aspect of the present disclosure.
FIG. 3B is a schematic representation of a CW-ToF imaging system in accordance with a further aspect of the present disclosure.

FIGS. 3A and 3B show two examples of conveyor belt systems 30-1, 30-2. In each conveyor belt system 30-1, 30-2, there is a CW-ToF camera system 300 including a laser 301 for outputting laser light, an imaging sensor 302 and a distance determination system 303.

An object 310, 320 is travelling along a conveyor belt 330, as shown by the three boxes at different time instances along the conveyor belt. In other words, the three boxes shown in FIGS. 3A and 3B are three view of the same box at different times. The imaging sensor 302 comprises a plurality of imaging pixels for accumulating charge based on incident light comprising reflected laser light off a first surface 311, 321 of the object 310, 320 at point 313. The distance determination system 303 is coupled to the imaging sensor 302 and it acquires three sets of charge samples from the image sensor 302 (although the principles of the present disclosure may be achieved with two sets of charge samples). A first set of charge samples is acquired at a first time at a first angle, zero degrees from the imaging sensor 302, relative to the first surface of the object 310, 320 by driving the laser 301 at a first modulation frequency and then reading out image sensor values. A second set of charge samples is acquired at a second time at a second angle, a, relative to the first surface of the object 310, 320 by driving the laser 301 at the first modulation frequency and then reading out image sensor values. A third set of charge samples is acquired at a third time at a third angle, α+β, relative to the first surface of the object 310, 320 by driving the laser 301 at the first modulation frequency and then reading out image sensor values. The first and second angles are different to one another since the object 310, 320 has moved between the first time and the second time. The distance travelled by the object on the conveyor belt may be known as the conveyor belt speed may be controlled and/or an encoder may be used that reports on the motion. A size may be defined as a distance between the first surface 311 and a second surface 312 of the object 310, 320. The size of the object 310, 320 is obtained based on the first set of charge samples and the second set of charge samples as well as a known or predetermined distance between the imaging sensor and the second surface 312 of the object 310, 320. Thus, size of the object 310, 320 is determined from the generated image information by the CW-ToF camera system faster than using multiple modulation frequencies and, consequently, inaccuracies and/or blurring in the generated image information can be reduced.

In these examples, say that the modulation frequency of the laser is 250 MHz, the wavelength of the modulated laser light is =3E8/250E6=1.2 m. Therefore, the ambiguity interval of the modulation signal is 0.6 m.

In FIG. 3A, it is known that a distance between the imaging sensor 302 and the second surface 312 of the object 310 is 180 cm. It is also known that the object 310 travels along the conveyor belt 330 by 50 cm after a first time instance and after a second time instance. Another constraint may be that the object can be as tall as 100 cm.

In FIG. 3B, it is known that a distance between the imaging sensor 352 and the second surface 322 of the object 320 is 180 cm. It is also known that the object 320 travels along the conveyor belt 330 by 50 cm after a first time instance and after a second time instance. Another constraint may be that the object can be as tall as 100 cm.

The ambiguity interval and the frequency of the modulation may define the accuracy of the measurement but also the allowed range with no wrapping issues. In the case of FIGS. 3A and 3B, there may only be two possibilities for the size of the object and so two views would suffice to resolve the uncertainty. If we had the camera at say 280 cm from the second surface of the object and the object could be up to 20 cm tall, it would be necessary to have three views at least as we have three possible ranges. A key aspect here is that a single snapshot of the scene is acquired, so we obtain a depth image with uncertainties related to phase wrapping. Then, another snapshot is taken after a short period of time. Thus, moving objects will appear to be in a different position. As is known the case of the conveyor belt example, or predictable as in the case of a mobile robot in a structured scene, the position of the object at various time instances of the multiple captures, the unwrapping uncertainty may be resolved using mathematics, an example of which is given below.

TABLE 1

| Object | Distance after 0.0 m | Distance after 0.5 m | Distance after 1.0 m |
|---|---|---|---|
| 3A | 80 mod 60 = 20 | 94 mod 60 = 34 | 128 mod 60 = 8 |
| 3B | 140 mod 60 = 20 | 149 mod 60 = 29 | 172 mod 60 = 52 |

Table 1 shows the real and perceived distances to the objects in FIGS. 3A and 3B. In the case of FIG. 3A, a tall object, which is 100 cm in height, is shown. At the first angle (azimuth or 0°), the object is at 80 cm from the imaging sensor but, since there is phase wrapping every 60 cm, the object is perceived at 20 cm form the imaging sensor. However, it is not known if the object is located at 20 cm, 80 cm, 140 cm, or 60*N+20 where N is a 0,1,2,3, etc. Given the location of the imaging sensor with respect to the conveyor belt, it can be derived that the object is 160 cm, 100 cm, or 40 cm in height. In this example, 160 cm may be discarded as it is known that objects do not exceed 100 cm in height. By comparing the measured distances at several positions of the object relative to the imaging sensor (three in this example), it may be realized that the tall object (row 3A in Table 1) will be perceived at 20 cm, 34 cm and 8 cm distances away from the imaging sensor in the three positions of the object at different time instances. Similarly, a short object (row 3B in Table 1) will be perceived at 20 cm, 29 cm, and 52 cm distances away from the imaging sensor in the three positions of the object at different time instances.

TABLE 2

| | Height after 0.0 m | | Height after 0.5 m range | | Height after 1 m | |
|---|---|---|---|---|---|---|
| Object | 1 | 2 | 1 | 2 | 1 | 2 |
| 3A | 100 | 40 | 100 | 34 | NaN | 100 |
| 3B | 100 | 40 | 106 | 40 | 130 | 40 |

Table 2 further illustrates the example of FIGS. 3A and 3B. According to the azimuth or 0° view, it is derived the tall object of FIG. 3A may be 100 cm or 40 cm tall, so both are possibilities as candidate sizes. In the case of a tall object (row 3A in Table 2), after it moves 50 cm from the first view along the conveyor belt, it is now derived that the tall object may be 100 cm or 34 cm tall as candidate sizes. In a third view, after travelling 100 cm from the first view along the conveyor belt, it is derived that the tall object could be 100 cm high (the other possibility falls outside the boundaries/ constraints set). It is clear now that this is a tall object, and its height is 100 cm and since we have different views, we can also increase accuracy. In the case of the shorter object (row 3B in Table 2), the vertical view could correspond to an object which is 100 cm or 40 cm tall as candidate sizes. In the second view, the object appears to be 106 cm or 40 cm tall as candidate sizes. In the third view, it looks like 130 cm or 40 cm high as candidate sizes. Therefore, the right height is 40 cm and with these multiple views we also reduce the error. The 100 cm and 40 cm determinations of FIGS. 3A and 3B, respectively, are results that are better than the other results. Other results can also be included when averaging values that are substantially the same from the candidate sizes. It is also possible to calculate width and volume of the object once height is known. It is also possible to calculate the distance from imaging sensor to first surface.

As the object 310, 320 moves further away, the illumination of the laser 301 can be increased in order to obtain stronger sets of charge samples from the reflected laser light off the first surface 311, 321 of the object 310, 320. Additionally or alternatively, since the size of the object may be bounded and the reflectivity of the object may be generally known, illumination may be optimized.

The examples of FIGS. 3A and 3B relate to conveyor belt examples. The present disclosure also relates to mobile robotics examples where movement of an object may be less predictable than a conveyor belt, which is explained in further detail below. In these example, multiple modulation frequencies may be used to supplement the single modulation frequency technique.

In a mobile robotics example, multiple modulation frequencies may be used to assist in the phase unwrapping problem and then depth information is obtained based on one or more modulation frequencies. When this mobile robotics example is used with the single modulation frequency technique of the present invention, depth information is obtained using a single modulation frequency. In that case, the depth is solely estimated based on the information provided by the last modulation frequency (i.e. the single modulation frequency) and the information obtained from the previous exposures to alternative modulation frequencies is used to resolve the unwrapping problems. Candidate sizes may be based on charge samples acquired using a second modulation signal having a second modulation frequency, which is different to the first modulation signal and the first modulation frequency. This second modulation signal step may be performed before the first modulation signal step. For example, the first modulation frequency may be used to determine candidate sizes, then the second modulation frequency may be used to determine candidate sizes more accurately, then the first modulation frequency may be used again to determine size of the object. In another example, the first modulation frequency may be used to determine candidate sizes, then the second modulation frequency may be used to determine candidate sizes more accurately, then a third modulation frequency may be used to determine candidate sizes yet more accurately or verify the candidate distances acquired using the second modulation frequency, then the first modulation frequency may be used again to determine size of the object.

In another mobile robotics example, the objects in the scene are identified and the distance to them are initially estimated using multiple modulation frequencies. Then, a single modulation frequency is used in future acquisitions to update the distances to these objects and unwrapping issues are solved by considering the distances to the different objects in previous acquisitions, potentially applying tracking or prediction techniques. So, the scene may be captured initially with multiple modulation frequencies. If there are moving objects (or a moving sensor as in the case of mobile robots), they may look blurry but it is possible to identify them and we will know what range they are in. Then, by moving to using a single modulation frequency, blurring may be avoided but the unwrapping problem still exists. However, by increasing the frame rate and tracking the objects, and assuming that the new distances between the objects and the sensor should evolve smoothly, it is possible to solve the unwrapping problem.

In such an example, a single modulation frequency may be used to derive that the moving object is X meters and 50 cm away. By estimating X at the beginning with the multiple frequencies, say x=2, in the next capture, if only the "cm range" is updated, 70 cm, it may be safe to assume that the distance is 270 cm. If the next capture is 90 cm, it may be safe to assume that the distance is 290 cm. If the next capture is 6 cm, it may be safe to assume that the distance is 306 cm. If next capture is 95 cm, it may be safe to assume that the object has moved backwards and the distance is now 295 cm.

FIG. 4A shows an example of another conveyor belt system 40-1. In the conveyor belt system 40, there is a CW-ToF camera system 400, 450 including a laser 401, 451 for outputting laser light, an imaging sensor 402, 452 and a distance determination system 403, 453.

An object 420 is travelling along a conveyor belt 430. In the CW-ToF camera system 400, a laser 401 outputs laser light and an imaging sensor 402 comprises a plurality of imaging pixels for accumulating charge based on incident light comprising reflected laser light off a first surface 421 of the object 420 at point 423. In the CW-ToF camera system 450, a laser 451 outputs laser light and an imaging sensor 452 comprises a plurality of imaging pixels for accumulating charge based on incident light comprising reflected laser light off a first surface of the object 420. A distance determination system 403, 453 for each CW-ToF camera system 400, 450 is coupled to the two imaging sensors 402, 452, respectively, and they each acquire a set of charge samples. The first set of charge samples is acquired by the first imaging sensor 402 at a first angle relative to the first surface of the object by driving the first laser 401 at a first modulation frequency and then reading out image sensor values. The second set of charge samples is acquired by the second imaging sensor 452 at a second angle relative to the first surface of the object by driving the second laser 451 at the first modulation frequency and then reading out image sensor values. The first and second angles are different to one another since the first and second imaging sensors 402, 452 are positioned in different locations relative to the object 410. A size may be defined as a distance between the first surface 411 and a second surface 412 of the object 410. The distance to the object 410 is obtained based on the first set of charge samples and the second set of charge samples as well as a known or predetermined or known relative location between the two imaging sensors 402, 452 and the second surface of the object 410. Thus, size of the object 410 is determined from the generated image information by the CW-ToF camera system faster than using multiple modulation frequencies and, consequently, inaccuracies and/or blurring in the generated image information can be reduced.

In FIG. 4A, it is known that a distance between the imaging sensors 402, 452 and the second surface 412 of the object 410 is 190 cm. It is also known that the distance between the two imaging sensors 402, 452 is 100 cm and that they are at the same height.

Assuming a 200 MHz modulation frequency, the ambiguity interval is 75 cm. Therefore, the point 413 seen by the left imaging sensor 402 may be at 27 cm, 102 cm, or 177 cm from the first surface 411 of the object 410. Similarly, the same pixels seen by the right camera may be at 28.9 cm, 103.9 cm, or 178.9 cm from the first surface 411 of the object 410. Applying trigonometry, it can be determined that the real distance is 103.9 cm from the first surface 411 of the object 410.

The environment may be controlled by imposing boundaries on the geometry of the problem e.g. allowing a limited range of distances which is 2× or 3× the range of the CW-ToF camera system that may simplify the unwrapping problem.

In FIG. 4A, a pixel on the surface of the object if identified (e.g. a corner that is easy to distinguish or some feature). That pixel is seen from cameras angles via two imaging sensors and due to unwrapping problem, there are several possible distances (imaging circles centered about the sensor and with different radius of the form x1+60N for imaging sensor 402 and x2+60N for imaging sensor 452 (the value 60 is explained the previous example of FIGS. 3A and 3B). By looking for the intersections of the circles from each of these two cameras and pick the one that meets the constrains of the problem, the size of the object may be determined.

In other examples, more than two imaging sensors could be used in order to acquire more captures, or using multiple views, so that unwrapping errors may be discerned in environments with less or no boundaries or restrictions and accuracy may improve as we have multiple depth estimations.

Alternatively to the arrangement of FIG. 4A, FIG. 4B shows a similar arrangement to FIG. 4A of a conveyor belt system 40-2. The difference between FIG. 4B and FIG. 4A is that the imaging sensors 402, 452 are arranged perpendicular to the motion direction of the conveyor belt and not in the direction of motion.

By locating the two imaging sensors in a line perpendicular to the motion, the process may be optimized. This arrangement may be especially useful to solve problems with hidden objects (a tall object limiting the view of short objects in some cases). In another example, it may be advantageous to have a single laser and synchronize it with both imaging sensors, i.e. a single light source and multiple imaging sensors, in order to reduce power and reduce interference between more than one laser.

The examples of FIGS. 4A and 4B work even if the object is still and not moving.

Figure 5:
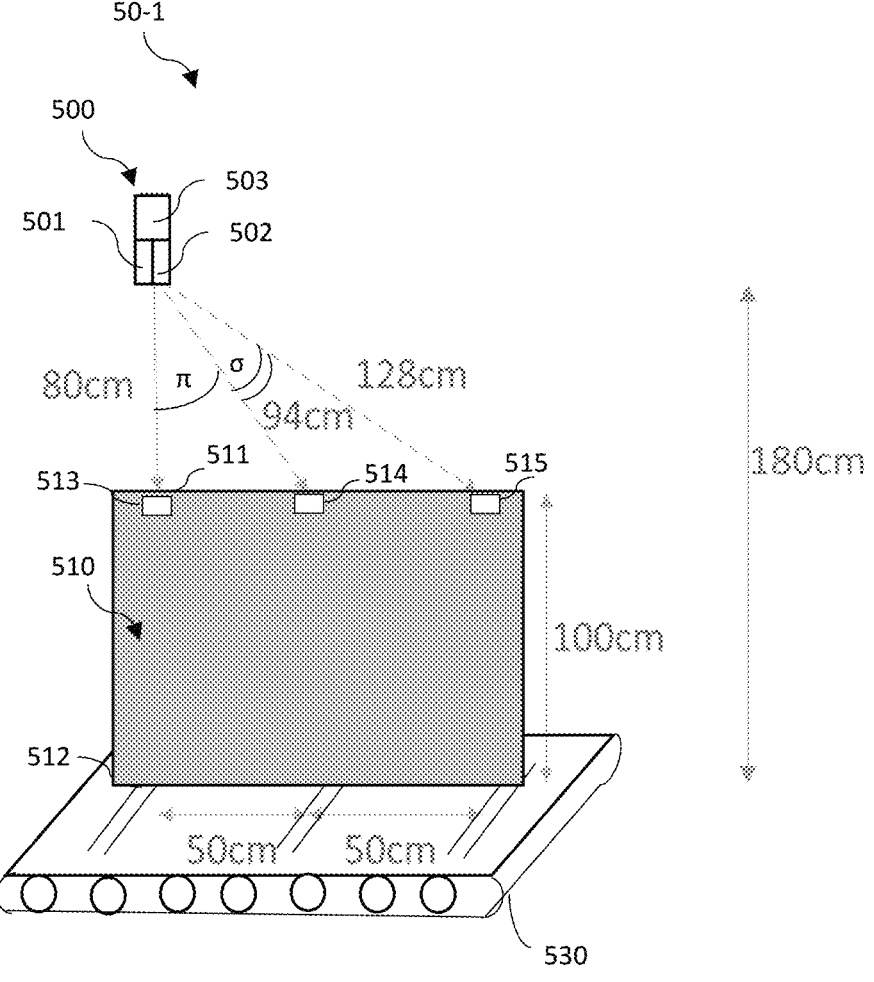
FIG. 5 is a schematic representation of a CW-ToF imaging system in accordance with a further aspect of the present disclosure.

FIG. 5 shows an example of another conveyor belt system 50. In the conveyor belt system 50, there is a CW-ToF camera system 500 including a laser 501 for outputting laser light, an imaging sensor 502 and a distance determination system 503.

An object 510 is travelling along a conveyor belt 530. In the CW-ToF camera system 500, a laser 501 outputs laser light and an imaging sensor 502 comprises a plurality of imaging pixels for accumulating charge based on incident light comprising reflected laser light off a first surface 512 of the object 510 at point 513, at point 514 and at point 515 (although the invention of the present disclosure may work in principle with two points). A distance determination system 503 for the CW-ToF camera system 500 is coupled to the imaging sensor 502, and it acquires a set of charge samples from point 513, 514 and 515, respectively. The first set of charge samples is acquired by the imaging sensor 502 at a first angle, zero degrees from a normal plane of the imaging sensor 502, relative to the first surface of the object by driving the laser 501 at a first modulation frequency and then reading out image sensor values. The second set of charge samples is acquired by the imaging sensor 502 at a second angle, n, relative to the first surface of the object by driving the laser 501 at the first modulation frequency and then reading out image sensor values. The third set of charge samples is acquired by the imaging sensor 502 at a second angle, n+G, relative to the first surface of the object by driving the laser 501 at the first modulation frequency and then reading out image sensor values. The first, second and third angles are different to one another since the points 513, 514, 515 are positioned in different locations relative to the imaging sensor 502. The first, second and third sets of charge samples are acquired at the same time in a single image. A size may be defined as a distance between the first surface 511 and a second surface 512 of the object 510. The size of the object 510 is obtained based on at least the first set of charge samples and the second set of charge samples as well as a known or predetermined distance between the imaging sensor 502 and the second surface of the object 510. By obtaining the "apparent" distances to the three points 513, 514 and 515, since it is known that they are on the same surface, the same calculations can be performed as if these points were substantially the same point on a box that has moved over a period of time. Thus, size of the object 510 is determined from the generated image information by the CW-ToF camera system faster than using multiple modulation frequencies and, consequently, inaccuracies and/or blurring in the generated image information can be reduced.

The example of FIG. 5 works even if the object is still and not moving. Here, although blurring may not be a concern, and therefore acquisition time may not be a concern, it has advantages in reducing power consumption and use of a single modulation frequency.

In this example, depth information is imaged using multiple acquisitions from the same image. The object 520 may be a large rectangular box with flat surfaces (quite typical use case) when an image is captured and acquiring sets of charge samples from the first surface 511 from different angles means that the wrapping uncertainty may be solved. If the box in this example is tall, there will be less pixels viewing the box than if the box is low. The arrangement of this example may produce a coarsely estimated size of the object compared to those of FIGS. 3A, 3B, 4A, 4B, for example.

This arrangement may consume less power than that of FIG. 4A or 4B since only one laser is used. This arrangement may avoid the problem of interference between two or more lasers.

FIG. 6 represents example method steps 600 according to an aspect of the present disclosure. In general, at step S610, a first set of charge samples is acquired from one or more imaging sensors reflected off a first surface of the object. At step S620, a second set of charge samples is acquired from the one or more imaging sensors reflected off a first surface of the object. Finally, at step S630, a size of an object is determined based on the first set of charge samples and the second set of charge samples, and a predetermined distance between the one or more imaging sensors and a second surface of the object, wherein the first set of charge samples and the second set of charge samples are acquired at a first angle and at a second angle.

FIG. 7 represents example method steps 700 according to an aspect of the present disclosure. At step S710, a first set of charge samples is acquired from one or more imaging sensors by driving one or more lasers to output laser light modulated with a first modulation signal, wherein the first modulation signal has a first frequency. After step S710, at step S720, image sensor values indicative of charge accumulated by at least some of the plurality of imaging pixels of the imaging sensor are read out as a result of laser light reflected off a first surface of an object. At step S730, a second set of charge samples is acquired from the one or more imaging sensors by driving the one or more lasers to output laser light modulated with the first modulation signal. After step S730, at step 7540, image sensor values indicative of charge accumulated by at least some of the plurality of imaging pixels of the imaging sensor are read out as a result of laser light reflected off the first surface of the object. At step S750, a size of the object is determined, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the object.

Step S720 happens after step S710. Step S740 also happens after step S730. However, step S730 does not necessarily happen after step S710 and step S740 does not necessarily happen after step S720. Step S750 happens after each of steps S710, S720, S730 and S740.

FIG. 8 represents example method steps 800 according to an aspect of the present disclosure. At step S810, a first set of charge samples is acquired from an imaging sensor at a first time by driving a laser to output laser light modulated with a first modulation signal, wherein the first modulation signal has a first frequency. After step S810, at step S820, image sensor values indicative of charge accumulated by at least some of the plurality of imaging pixels of the imaging sensor are read out as a result of laser light reflected off a first surface of a moving object. At step S830, a second set of charge samples is acquired from the imaging sensor at a second time by driving the laser to output laser light modulated with the first modulation signal. After step S830, at step S840, image sensor values indicative of charge accumulated by at least some of the plurality of imaging pixels of the imaging sensor are read out as a result of laser light reflected off the first surface of the moving object. At step S850, a size of the moving object is determined, wherein the size is a distance between the first surface and a second surface of the moving object, based on the first set of charge samples and the second set of charge samples and a predetermined distance between the imaging sensor and the second surface of the moving object, wherein the first set of charge samples and the second set of charge samples are acquired at a first angle and at a second angle, respectively, relative to the moving object.

Step S820 happens after step S810. Step S840 also happens after step S830. However, step S830 does not necessarily happen after step S810 and step S840 does not necessarily happen after step S820. Step S850 happens after each of steps S810, S820, S830 and S840.

FIG. 9 represents example method steps 900 according to an aspect of the present disclosure. At step S910, a first set of charge samples is acquired from a first imaging sensor by driving a first laser to output laser light modulated with a first modulation signal, wherein the first modulation signal has a first frequency. After step S910, at step S920, image sensor values indicative of charge accumulated by at least some of the plurality of imaging pixels of the first imaging sensor are read out as a result of laser light reflected off a first surface of an object. At step S930, a second set of charge samples is acquired from a second imaging sensor by driving a second laser to output laser light modulated with the first modulation signal. After step S930, at step S940, image sensor values indicative of charge accumulated by at least some of the plurality of imaging pixels of the second imaging sensor are read out as a result of laser light reflected off the first surface of the object. At step S950, a size of the object is determined, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the object.

Step S920 happens after step S910. Step S940 also happens after step S930. However, step S930 does not necessarily happen after step S910 and step S940 does not necessarily happen after step S920. Step S950 happens after each of steps S910, S920, S930 and S940.

The skilled person will readily appreciate that various alterations or modifications may be made to the above described aspects of the disclosure without departing from the scope of the disclosure.

The image sensors described above may be a single ended pixel or differential pixel define (for example, a CMOS single ended or differential sensor design). Therefore, it will be appreciated that each pixel readout may either be single ended or differential.

NUMBERED ASPECTS

By way of non-limiting example, some aspects of the disclosure are set out in the following numbered clauses.

1. A continuous wave time of flight, CW-ToF, camera system comprising:
    one or more lasers for outputting laser light;
    one or more imaging sensors, the one or more image sensors each comprising a plurality of imaging pixels for accumulating charge based on incident light comprising reflected laser light off a first surface of an object; and
a distance determination system coupled to the one or more imaging sensors and configured to:
acquire a first set of charge samples from the one or more imaging sensors in respect of the object by:
    a) driving the one or more lasers to output laser light modulated with a first modulation signal, wherein the first modulation signal has a first frequency; and
    b) after step a, reading out image sensor values indicative of charge accumulated by at least some of the plurality of imaging pixels of the one or more imaging sensors;
acquire a second set of charge samples from the one or more imaging sensors in respect of the object by:
    c) driving the one or more lasers to output laser light modulated with the first modulation signal; and
    d) after step c, reading out image sensor values indicative of charge accumulated by at least some of the plurality of imaging pixels of the one or more imaging sensors; and
determine a size of the object, wherein the size is a distance between the first surface and a second surface of the object, based on the first set of charge samples and the second set of charge samples and a predetermined distance between the one or more imaging sensors and the second surface of the object,
wherein the first set of charge samples and the second set of charge samples are acquired at a first angle and at a second angle, respectively, relative to the first surface of the object.

2. The CW-ToF camera system of clause 1, wherein the one or more imaging sensors are configured to acquire the first set of charge samples and the second set of charge samples from laser light reflected off substantially the same point of the object.

3. The CW-ToF camera system of clause 1, wherein the one or more imaging sensors are configured to acquire the first set of charge samples and the second set of charge samples from laser light reflected off different points of the object.

4. The CW-ToF camera system of clause 3, wherein the first set of charge samples is acquired from a first subset of the plurality of imaging pixels of the imaging sensor and the second set of charge samples is acquired from a second subset of the plurality of imaging pixels of the imaging sensor.

5. The CW-ToF camera system of any preceding clause, wherein the one or more imaging sensors are positioned substantially above the object.

6. The CW-ToF camera system of clause 5, wherein at least one of the first set of charge samples and the second set of charge samples is acquired substantially directly above the object.

7. The CW-ToF camera system of any preceding clause, wherein the first angle and the second angle are different, preferably at least 10 degrees apart, more preferably 20 degrees apart, yet more preferably 30 degrees apart.

8. The CW-ToF camera system of any preceding clause, wherein the object is a moving object.

9. The CW-ToF camera system of clause 7, wherein the object is moving at a constant speed.

10. The CW-ToF camera system of clause 7 or 9, wherein the moving object is moving substantially linearly, preferably in a plane that is substantially parallel to the plane of the one or more imaging sensors.

11. The CW-ToF camera system of any preceding clause, wherein the first surface of the object is substantially flat surface, preferably a top surface of the object.

12. The CW-ToF camera system of any preceding clause, wherein the object is a substantially shaped as a cube, cuboid, box or cylinder.

13. The CW-ToF camera system of any of clauses 7 to 12, wherein the first set of charge samples are acquired from a first imaging sensor at a first time and the second set of charge samples are acquired from the first imaging sensor at a second time, and wherein the linear distance between the moving object at the first time and at the second time is known.

14. The CW-ToF camera system of any of clauses 1 to 12, wherein the CW-ToF camera system comprises at least two imaging sensors and a relative location between the at least two imaging sensors is known.

15. The CW-ToF camera system of clause 14, wherein the first set of charge samples are acquired from a first imaging sensor at a first time and the second set of charge samples are acquired from a second imaging sensor at the first time.

16. The CW-ToF camera system of any preceding clause, wherein the distance determination system is configured to:

determine a relative phase between the outputted laser light and the reflected laser light received at the one or more imaging sensors when the first set of charge samples is acquired at the first angle;

determine a first plurality of candidate distances of the object from the one or more imaging sensors at the first angle based on the relative phase and an ambiguity interval of the first modulation signal;

determine a relative phase between the outputted laser light and the reflected laser light received at the one or more imaging sensors when the second set of charge samples is acquired at the second angle; and determine a second plurality of candidate distances of the object from the one or more imaging sensors at the second angle based on the relative phase and an ambiguity interval of the first modulation signal.

17. The CW-ToF camera system of clause 16, wherein the distance determination system is further configured to:

determine a first plurality of candidate sizes of the object based on the first plurality of candidate distances of the first surface the object from the one or more imaging sensors, the predetermined distance between the one or more imaging sensors and the second surface of the object, and an angle between the second surface of the object and a normal to a plane of the one or more imaging sensors; and determine a second plurality of candidate sizes of the object based on the second plurality of candidate distances of the first surface the object from the one or more imaging sensors, the predetermined distance between the one or more imaging sensors and the second surface of the object, and an angle between the second surface of the object and a normal to a plane of the one or more imaging sensors.

18. The CW-ToF camera system of clause 17, wherein the distance determination system is further configured to:

identify a first value from the first plurality of candidate sizes and a second value from the second plurality of candidate sizes that are substantially the same.

19. The CW-ToF camera system of clause 18, wherein the distance determination system is further configured to:

determine the size of the object at least by averaging the first value and the second value.

20. The CW-ToF camera system of any of clauses 14 to 19, wherein the first plurality of candidate distances and/or the second plurality of candidate distances are based on charge samples acquired using a second modulation signal having a second modulation frequency.

21. The CW-ToF camera system of any of clauses 10 to 18, wherein the CW-ToF camera system is configured to identify the object and estimate distance to the object using a second modulation frequency prior to determining the first and second plurality of candidate distances.

22. A method of operating a continuous wave time of flight, CW-ToF, camera system for imaging a first surface of an object, the method comprising:

acquiring a first set of charge samples from one or more imaging sensors in respect of the object by:

a) driving one or more lasers to output laser light modulated with a first modulation signal, wherein the first modulation signal has a first frequency; and b) after step a, reading out image sensor values indicative of charge accumulated by at least some of the plurality of imaging pixels of the one or more imaging sensors as a result of laser light reflected off a first surface of the object;

acquiring a second set of charge samples from the one or more imaging sensors in respect of the object by:

c) driving the one or more lasers to output laser light modulated with the first modulation signal; and d) after step c, reading out image sensor values indicative of charge accumulated by at least some of the plurality of imaging pixels of the one or more imaging sensor as a result of laser light reflected off the first surface of the object; and determining, by a distance determination system coupled to the one or more imaging sensors, a size of the object, wherein the size is a distance between the first surface and a second surface of the object, based on the first set of charge samples and the second set of charge samples and a predetermined distance between the one or more imaging sensors and the second surface of the object, wherein the first set of charge samples and the second set of charge samples are acquired at a first angle and at a second angle, respectively, relative to the first surface of the object.

23. The method of clause 21, wherein determining the size of the object comprises:

determining a relative phase between the outputted laser light and the reflected laser light received at the one or more imaging sensors when the first set of charge samples is acquired at the first angle;

determining a first plurality of candidate distances of the object from the one or more imaging sensors at the first angle based on the relative phase and an ambiguity interval of the first modulation signal;

determining a relative phase between the outputted laser light and the reflected laser light received at the one or more imaging sensors when the second set of charge samples is acquired at the second angle; and determining a second plurality of candidate distances of the object from the one or more imaging sensors at the second angle based on the relative phase and an ambiguity interval of the first modulation signal.

24. The method of clause 22, further comprising:

determining a first plurality of candidate sizes of the object based on the first plurality of candidate distances of the first surface the object from the one or more imaging sensors, the predetermined distance between the one or more imaging sensors and the second surface of the object, and an angle between the second surface of the object and a normal to a plane of the one or more imaging sensors; and determining a second plurality of candidate sizes of the object based on the second plurality of candidate distances of the first surface the object from the one or more imaging sensors, the predetermined distance between the one or more imaging sensors and the second surface of the object, and an angle between the second surface of the object and a normal to a plane of the one or more imaging sensors.

25. The method of clause 23, further comprising:

identifying a first value from the first plurality of candidate sizes and a second value from the second plurality of candidate sizes that are substantially the same.

26. The method of clause 24, further comprising:

determining the size of the object at least by averaging the first value and the second value.

27. The method of any of clauses 22 to 25, wherein the first plurality of candidate distances and/or the second plurality of candidate distances are based on charge samples acquired using a second modulation signal having a second modulation frequency.

28. The method of any of clauses 22 to 27, wherein the method further comprises identifying the object and estimating distance to the object using a second modulation frequency prior to determining the first and second plurality of candidate distances, and/or wherein the method further comprises identifying the object and estimating distance to the object using a second modulation frequency prior to determining the first and second plurality of candidate distances.

29. A continuous wave time of flight, CW-ToF, camera system comprising:

a laser for outputting laser light;

an imaging sensor comprising a plurality of imaging pixels for accumulating charge based on incident light comprising reflected laser light off a first surface of a moving object; and a distance determination system coupled to the imaging sensor and configured to:

acquire a first set of charge samples from the imaging sensor in respect of a moving object at a first time by:

a) driving the laser to output laser light modulated with a first modulation signal, wherein the first modulation signal has a first frequency; and b) after step a, reading out image sensor values indicative of charge accumulated by at least some of the plurality of imaging pixels of the imaging sensor;

acquire a second set of charge samples from the imaging sensor in respect of the moving object at a second time by:

c) driving the laser to output laser light modulated with the first d) after step c, reading out image sensor values indicative of charge accumulated by at least some of the plurality of imaging pixels of the imaging sensor; and determine by a distance determination system coupled to the imaging sensor, a size of the moving object, wherein the size is a distance between the first surface and a second surface of the moving object, based on the first set of charge samples and the second set of charge samples and a predetermined distance between the imaging sensor and the second surface of the moving object, wherein the first set of charge samples and the second set of charge samples are acquired at a first angle and at a second angle, respectively, relative to the first surface of the moving object.

30. The CW-ToF camera system of clause 29, wherein the imaging sensor is configured to acquire the first set of charge samples and the second set of charge samples from laser light reflected off substantially the same point of the object.

31. The CW-ToF camera system of clause 29 or 30, wherein the imaging sensor is positioned substantially above the object.

32. The CW-ToF camera system of clause 31, wherein at least one of the first set of charge samples and the second set of charge samples is acquired substantially directly above the object.

33. The CW-ToF camera system of any of clauses 29 to 32, wherein the first angle and the second angle are different.

34. The CW-ToF camera system of any of clauses 29 to 33, wherein the object is moving at a constant speed.

35. The CW-ToF camera system of any of clauses 29 to 34, wherein the moving object is moving substantially linearly.

36. The CW-ToF camera system of any of clauses 29 to 35, wherein the first surface of the object is substantially flat surface.

37. The CW-ToF camera system of any of clauses 29 to 36, wherein the object is a substantially shaped as a cube, cuboid, box or cylinder.

38. The CW-ToF camera system of any of clauses 29 to 37, wherein the first set of charge samples are acquired from the imaging sensor at a first time and the second set of charge samples are acquired from the imaging sensor at a second time, and wherein the linear distance between the moving object at the first time and at the second time is known.

39. The CW-ToF camera system of any of clauses 29 to 38, wherein the distance determination system is configured to:

determine a relative phase between the outputted laser light and the reflected laser light received at the imaging sensor when the first set of charge samples is acquired at the first angle;

determine a first plurality of candidate distances of the object from the imaging sensor at the first angle based on the relative phase and an ambiguity interval of the first modulation signal;

determine a relative phase between the outputted laser light and the reflected laser light received at the imaging sensor when the second set of charge samples is acquired at the second angle; and determine a second plurality of candidate distances of the object from the imaging sensor at the second angle based on the relative phase and an ambiguity interval of the first modulation signal.

40. The CW-ToF camera system of clause 39, wherein the distance determination system is further configured to:

determine a first plurality of candidate sizes of the object based on the first plurality of candidate distances of the first surface the object from the imaging sensor, the predetermined distance between the imaging sensor and the second surface of the object, and an angle between the second surface of the object and a normal to a plane of the imaging sensor; and determine a second plurality of candidate sizes of the object based on the second plurality of candidate distances of the first surface the object from the imaging sensor, the predetermined distance between the imaging sensor and the second surface of the object, and an angle between the second surface of the object and a normal to a plane of the imaging sensor.

41. The CW-ToF camera system of clause 40, wherein the distance determination system is further configured to:

identify a first value from the first plurality of candidate sizes a first candidate size and a second value from the second plurality of candidate sizes that are substantially the same.

42. The CW-ToF camera system of clause 41, wherein the distance determination system is further configured to:

determine the size of the object at least by averaging the first value and the second value.

43. The CW-ToF camera system of any of clauses 39 to 42, wherein the first plurality of candidate distances and/or the second plurality of candidate distances are based on charge samples acquired using a second modulation signal having a second modulation frequency, and/or wherein the CW-ToF camera system is configured to identify the object and estimate distance to the object using a second modulation frequency prior to determining the first and second plurality of candidate distances.

44. A method of operating a continuous wave time of flight, CW-ToF, camera system for imaging a first surface of a moving object, the method comprising:

acquiring a first set of charge samples from an imaging sensor in respect of the moving object at a first time by:

a) driving a laser to output laser light modulated with a first modulation signal, wherein the first modulation signal has a first frequency; and b) after step a, reading out image sensor values indicative of charge accumulated by at least some of the plurality of imaging pixels of the imaging sensor as a result of laser light reflected off the first surface of the object;

acquiring a second set of charge samples from the imaging sensor in respect of the moving object at a second time by:

c) driving the laser to output laser light modulated with the first modulation signal; and d) after step c, reading out image sensor values indicative of charge accumulated by at least some of the plurality of imaging pixels of the imaging sensor as a result of laser light reflected off the first surface of the moving object; and determining, by a distance determination system coupled to the imaging sensor, a size of the moving object, wherein the size is a distance between the first surface and a second surface of the moving object, based on the first set of charge samples and the second set of charge samples and a predetermined distance between the imaging sensor and the second surface of the moving object, wherein the first set of charge samples and the second set of charge samples are acquired at a first angle and at a second angle, respectively, relative to the first surface of the moving object.

45. The method of clause 44, wherein determining the size of the object comprises:

determining a relative phase between the outputted laser light and the reflected laser light received at the imaging sensor when the first set of charge samples is acquired at the first angle;

determining a first plurality of candidate distances of the object from the imaging sensor at the first angle based on the relative phase and an ambiguity interval of the first modulation signal;

determining a relative phase between the outputted laser light and the reflected laser light received at the imaging sensor when the second set of charge samples is acquired at the second angle; and determining a second plurality of candidate distances of the object from the imaging sensor at the second angle based on the relative phase and an ambiguity interval of the first modulation signal.

46. The method of clause 45, further comprising:

determining a first plurality of candidate sizes of the object based on the first plurality of candidate distances of the first surface the object from the imaging sensor, the predetermined distance between the imaging sensor and the second surface of the object, and an angle between the second surface of the object and a normal to a plane of the one imaging sensors; and determining a second plurality of candidate sizes of the object based on the second plurality of candidate distances of the first surface the object from the imaging sensor, the predetermined distance between the imaging sensor and the second surface of the object, and an angle between the second surface of the object and a normal to a plane of the imaging sensor.

47. The method of clause 46, further comprising:

identifying a first value from the first plurality of candidate sizes a first candidate size and a second value from the second plurality of candidate sizes that are substantially the same.

48. The method of clause 47, further comprising:

determining the size of the object at least by averaging the first value and the second value.

49. The method of any of clauses 44 to 48, wherein the first plurality of candidate distances and/or the second plurality of candidate distances are based on charge samples acquired using a second modulation signal having a second modulation frequency, and/or wherein the method further comprises identifying the object and estimating distance to the object using a second modulation frequency prior to determining the first and second plurality of candidate distances.

50. A continuous wave time of flight, CW-ToF, camera system comprising:

at least a first and a second laser for outputting laser light;

at least a first and a second imaging sensor, the at least two imaging sensors each comprising a plurality of imaging pixels for accumulating charge based on incident light comprising reflected laser light off a first surface of an object; and a distance determination system coupled to the first and second imaging sensors and configured to:

acquire a first set of charge samples from the at least two imaging sensors in respect of the object at a first time by:

a) driving a first laser to output laser light modulated with a first modulation signal, wherein the first modulation signal has a first frequency; and b) after step a, reading out image sensor values indicative of charge accumulated by at least some of the plurality of imaging pixels of the first imaging sensor;

acquire a second set of charge samples from the at least two imaging sensors in respect of the object at the first time by:

c) driving a second laser to output laser light modulated with the first d) after step c, reading out image sensor values indicative of charge accumulated by at least some of the plurality of imaging pixels of the second imaging sensor; and determine a size of the object, wherein the size is a distance between the first surface and a second surface of the object, based on the first set of charge samples and the second set of charge samples and a predetermined distance between the first and second imaging sensors and the second surface of the object, wherein the first set of charge samples and the second set of charge samples are acquired at a first angle and at a second angle, respectively, relative to the first surface of the object.

51. The CW-ToF camera system of clause 50, wherein the first and second imaging sensors are configured to acquire the first set of charge samples and the second set of charge samples from laser light reflected off substantially the same point of the object.

52. The CW-ToF camera system of clause 50 or 51, wherein the first and second imaging sensors are positioned substantially above the object.

53. The CW-ToF camera system of clause 51, wherein at least one of the first set of charge samples and the second set of charge samples is acquired substantially directly above the object.

54. The CW-ToF camera system of any of clauses 50 to 53, wherein the first angle and the second angle are different.

55. The CW-ToF camera system of any of clauses 54, wherein the object is a moving object.

56. The CW-ToF camera system of clause 55, wherein the object is moving at a constant speed.

57. The CW-ToF camera system of clause 55 or 56, wherein the moving object is moving substantially linearly.

58. The CW-ToF camera system of any of clauses 50 to 57, wherein the first surface of the object is substantially flat surface.

59. The CW-ToF camera system of any of clauses 50 to 58, wherein the object is a substantially shaped as a cube, cuboid, box or cylinder.

60. The CW-ToF camera system of any of clauses 50 to 59, wherein a relative location between the first and second imaging sensors is known.

61. The CW-ToF camera system of clause 60, wherein the first set of charge samples are acquired from the first imaging sensor at a first time and the second set of charge samples are acquired from the second imaging sensor at the first time.

62. The CW-ToF camera system of any of clauses 50 to 61, wherein the distance determination system is configured to:

determine a relative phase between the outputted laser light form the first laser and the reflected laser light received at the first imaging sensor when the first set of charge samples anis acquired at the first angle;

determine a first plurality of candidate distances of the object from the first imaging sensor at the first angle based on the relative phase and an ambiguity interval of the first modulation signal;

determine a relative phase between the outputted laser light from the second laser and the reflected laser light received at the second imaging sensors when t the second set of charge samples is acquired at the second angle; and determine a second plurality of candidate distances of the object from the second imaging sensor at the second angle based on the relative phase and an ambiguity interval of the first modulation signal.

63. The CW-ToF camera system of clause 62, wherein the distance determination system is further configured to:

determine a first plurality of candidate sizes of the object based on the first plurality of candidate distances of the first surface the object from the first imaging sensor, the predetermined distance between the first and second imaging sensors and the second surface of the object, and an angle between the second surface of the object and a normal to a plane of the first and second imaging sensors; and determine a second plurality of candidate sizes of the object based on the second plurality of candidate distances of the first surface the object from the second imaging sensor, the predetermined distance between first and second imaging sensors and the second surface of the object, and an angle between the second surface of the object and a normal to a plane of the first and second imaging sensors.

64. The CW-ToF camera system of clause 63, wherein the distance determination system is further configured to:

identify a first value from the first plurality of candidate and a second value from the second plurality of candidate sizes that are substantially the same.

65. The CW-ToF camera system of clause 64, wherein the distance determination system is further configured to:

determine the size of the object at least by averaging the first value and the second value.

66. The CW-ToF camera system of any of clauses 62 to 65, wherein the first plurality of candidate distances and/or the second plurality of candidate distances are based on charge samples acquired using a second modulation signal having a second modulation frequency, and/or wherein the CW-ToF camera system is configured to identify the object and estimate distance to the object using a second modulation frequency prior to determining the first and second plurality of candidate distances.

67. A method of operating a continuous wave time of flight, CW-ToF, camera system for imaging a first surface of an object, the method comprising:

acquiring a first set of charge samples from a first imaging sensor in respect of the object by:

a) driving a first laser to output laser light modulated with a first modulation signal, wherein the first modulation signal has a first frequency; and b) after step a, reading out image sensor values indicative of charge accumulated by at least some of the plurality of imaging pixels of the first imaging sensor as a result of laser light reflected off first surface of the object;

acquiring a second set of charge samples from a second imaging sensor in respect of the object by:

c) driving a second laser to output laser light modulated with the first modulation signal; and d) after step c, reading out image sensor values indicative of charge accumulated by at least some of the plurality of imaging pixels of the second imaging sensor as a result of laser light reflected off the first surface of the object; and determining, by a distance determination system coupled to the first and second imaging sensors, a size of the object, wherein the size is a distance between the first surface and a second surface of the object, based on the first set of charge samples and the second set of charge samples and a predetermined distance between the first and second imaging sensors and the second surface of the object, wherein the first set of charge samples and the second set of charge samples are acquired at a first angle and at a second angle, respectively, relative to the first surface of the object.

68. The method of clause 67, wherein determining the size of the object comprises:

determining a relative phase between the outputted laser light from the first laser and the reflected laser light received at the first imaging sensor when the first set of charge samples is acquired at the first angle;

determining a first plurality of candidate distances of the object from the first imaging sensor at the first angle based on the relative phase and an ambiguity interval of the first modulation signal;

determining a relative phase between the outputted laser light from the second laser and the reflected laser light received at the second imaging sensor when the second set of charge samples is acquired at the second angle; and determining a second plurality of candidate distances of the object from the second imaging sensor at the second angle based on the relative phase and an ambiguity interval of the first modulation signal.

69. The method of clause 68, further comprising:

determining a first plurality of candidate sizes of the object based on the first plurality of candidate distances of the first surface the object from the first imaging sensor, the predetermined distance between the first and second imaging sensors and the second surface of the object, and an angle between the second surface of the object and a normal to a plane of the one or more imaging sensors; and determining a second plurality of candidate sizes of the object based on the second plurality of candidate distances of the first surface the object from the second imaging sensors, the predetermined distance between the first and second imaging sensors and the second surface of the object, and an angle between the second surface of the object and a normal to a plane of the one or more imaging sensors.

70. The method of clause 69 further comprising:

identifying a first value from the first plurality of candidate sizes and a second value from the second plurality of candidate sizes that are substantially the same.

71. The method of clause 70, further comprising:

determining the size of the object at least by averaging the first value and the second value.

72. The method of any of clauses 71, wherein the first plurality of candidate distances and/or the second plurality of candidate distances are based on charge samples acquired using a second modulation signal having a second modulation frequency, and/or wherein the method further comprises identifying the object and estimating distance to the object using a second modulation frequency prior to determining the first and second plurality of candidate distances.

73. A continuous wave time of flight, CW-ToF, camera system comprising:

a laser for outputting laser light;

an imaging sensor, the imaging sensor comprising a plurality of imaging pixels for accumulating charge based on incident light comprising reflected laser light off a first surface of an object; and a distance determination system coupled to the imaging sensor and configured to:

acquire a first set of charge samples from a first subset of the plurality of imaging pixels of the imaging sensor in respect of the object at a first time by:

a) driving a first laser to output laser light modulated with a first modulation signal, wherein the first modulation signal has a first frequency; and b) after step a, reading out image sensor values indicative of charge accumulated by the first subset of the plurality of imaging pixels of the imaging sensor;

acquire a second set of charge samples from a second subset of the plurality of imaging pixels of the imaging sensor in respect of the object at the first time by:

c) driving a second laser to output laser light modulated with the first modulation signal; and d) after step c, reading out image sensor values indicative of charge accumulated by the second subset of imaging pixels of the imaging sensor; and determine a size of the object, wherein the size is a distance between the first surface and a second surface of the object, based on the first set of charge samples and the second set of charge samples and a predetermined distance between the imaging sensor and the second surface of the object, wherein the first set of charge samples and the second set of charge samples are acquired at a first angle and at a second angle, respectively, relative to the first surface of the object.

74. The CW-ToF camera system of clause 7319, wherein the imaging sensor is configured to acquire the first set of charge samples and the second set of charge samples from laser light reflected off different points of the object.

75. The CW-ToF camera system of clause 73 or 74, wherein the first and second imaging sensors are positioned substantially above the object.

76. The CW-ToF camera system of clause 75, wherein at least one of the first set of charge samples and the second set of charge samples is acquired substantially directly above the object.

77. The CW-ToF camera system of any of clauses 73 to 76, wherein the first angle and the second angle are different.

78. The CW-ToF camera system of any of clauses 73 to 77, wherein the object is a moving object.

79. The CW-ToF camera system of clause 78, wherein the object is moving at a constant speed.

80. The CW-ToF camera system of clause 78 or 79, wherein the moving object is moving substantially linearly.

81. The CW-ToF camera system of any of clauses 73 to 80, wherein the first surface of the object is substantially flat surface.

82. The CW-ToF camera system of any of clauses 73 to 81, wherein the object is a substantially shaped as a cube, cuboid, box or cylinder.

83. The CW-ToF camera system of any of clauses 73 to 82, wherein a distance between the first and second points of the object from which the first set of charge sample and the second set of charge samples are acquired is known.

84. The CW-ToF camera system of any of clauses 73 to 83, wherein the distance determination system is configured to:

determine a relative phase between the outputted laser light from the laser and the reflected laser light received at the imaging sensor when the first set of charge samples is acquired at the first angle;

determine a first plurality of candidate distances of the object from the imaging sensor at the first angle based on the relative phase and an ambiguity interval of the first modulation signal;

determine a relative phase between the outputted laser light from the laser and the reflected laser light received at the second imaging sensors when the second set of charge samples is acquired at the second angle; and determine a second plurality of candidate distances of the object from the imaging sensor at the second angle based on the relative phase and an ambiguity interval of the first modulation signal.

85. The CW-ToF camera system of clause 84, wherein the distance determination system is further configured to:

determine a first plurality of candidate sizes of the object based on the first plurality of candidate distances of the first surface the object from the first imaging sensor, the predetermined distance between the imaging sensor and the second surface of the object, and an angle between the second surface of the object and a normal to a plane of the imaging sensor; and determine a second plurality of candidate sizes of the object based on the second plurality of candidate distances of the first surface the object from the imaging sensor, the predetermined distance between imaging sensor and the second surface of the object, and an angle between the second surface of the object and a normal to a plane of the imaging sensor.

86. The CW-ToF camera system of clause 85, wherein the distance determination system is further configured to:

identify a first value from the first plurality of candidate and a second value from the second plurality of candidate sizes that are substantially the same.

87. The CW-ToF camera system of clause 86, wherein the distance determination system is further configured to:

determine the size of the object at least by averaging the first value and the second value.

88. The CW-ToF camera system of any of clauses 84 to 87, wherein the first plurality of candidate distances and/or the second plurality of candidate distances are based on charge samples acquired using a second modulation signal having a second modulation frequency, and/or wherein the CW-ToF camera system is configured to identify the object and estimate distance to the object using a second modulation frequency prior to determining the first and second plurality of candidate distances.

89. A method of operating a continuous wave time of flight, CW-ToF, camera system for imaging a first surface of an object, the method comprising:

acquiring a first set of charge samples from a first subset of the plurality of imaging pixels of the imaging sensor in respect of the object at a first time by:

a) driving a first laser to output laser light modulated with a first modulation signal, wherein the first modulation signal has a first frequency; and b) after step a, reading out image sensor values indicative of charge accumulated by the first subset of the plurality of imaging pixels of the imaging sensor;

acquiring a second set of charge samples from a second subset of the plurality of imaging pixels of the imaging sensor in respect of the object at the first time by:

c) driving a second laser to output laser light modulated with the first modulation signal; and d) after step c, reading out image sensor values indicative of charge accumulated by the second subset of imaging pixels of the imaging sensor; and determining a size of the object, wherein the size is a distance between the first surface and a second surface of the object, based on the first set of charge samples and the second set of charge samples and a predetermined distance between the imaging sensor and the second surface of the object, wherein the first set of charge samples and the second set of charge samples are acquired at a first angle and at a second angle, respectively, relative to the first surface of the object.

90. The method of clause 89, wherein determining the size of the object comprises:

determine a relative phase between the outputted laser light from the laser and the reflected laser light received at the imaging sensor when the first set of charge samples is acquired at the first angle;

determine a first plurality of candidate distances of the object from the imaging sensor at the first angle based on the relative phase and an ambiguity interval of the first modulation signal;

determine a relative phase between the outputted laser light from the laser and the reflected laser light received at the second imaging sensors when the second set of charge samples is acquired at the second angle; and determine a second plurality of candidate distances of the object from the imaging sensor at the second angle based on the relative phase and an ambiguity interval of the first modulation signal.

91. The method of clause 90, further comprising:

determine a first plurality of candidate sizes of the object based on the first plurality of candidate distances of the first surface the object from the first imaging sensor, the predetermined distance between the imaging sensor and the second surface of the object, and an angle between the second surface of the object and a normal to a plane of the imaging sensor; and determine a second plurality of candidate sizes of the object based on the second plurality of candidate distances of the first surface the object from the imaging sensor, the predetermined distance between imaging sensor and the second surface of the object, and an angle between the second surface of the object and a normal to a plane of the imaging sensor.

92. The method of clause 91, further comprising: identifying a first value from the first plurality of candidate sizes and a second value from the second plurality of candidate sizes that are substantially the same.

93. The method of clause 92, further comprising: determining the size of the object at least by averaging the first value and the second value.

94. The method of any of clauses 93, wherein the first plurality of candidate distances and/or the second plurality of candidate distances are based on charge samples acquired using a second modulation signal having a second modulation frequency.

The invention claimed is:

1. A continuous wave time of flight, CW-ToF, camera system comprising:

one or more lasers for outputting laser light;

one or more imaging sensors, the one or more image sensors each comprising a plurality of imaging pixels for accumulating charge based on incident light comprising reflected laser light off a first surface of an object; and a distance determination system coupled to the one or more imaging sensors and configured to:

acquire a first set of charge samples from the one or more imaging sensors in respect of the object by:

a) driving the one or more lasers to output laser light modulated with a first modulation signal, wherein the first modulation signal has a first frequency; and b) after step a, reading out image sensor values indicative of charge accumulated by at least some of the plurality of imaging pixels of the one or more imaging sensors;

acquire a second set of charge samples from the one or more imaging sensors in respect of the object by:

c) driving the one or more lasers to output laser light modulated with the first modulation signal; and d) after step c, reading out image sensor values indicative of charge accumulated by at least some of the plurality of imaging pixels of the one or more imaging sensors; and determine a size of the object, wherein the size is a distance between the first surface and a second surface of the object, based on the first set of charge samples acquired at a first angle relative to the first surface and the second set of charge samples acquired at a second angle relative to the second surface, the first angle, the second angle, and a predetermined distance between the one or more imaging sensors and the second surface of the object, wherein the first angle and the second angle are different.

2. The CW-ToF camera system of claim 1, wherein the one or more imaging sensors are configured to acquire the first set of charge samples and the second set of charge samples from laser light reflected off substantially the same point of the object.

3. The CW-ToF camera system of claim 1, wherein the one or more imaging sensors are configured to acquire the first set of charge samples and the second set of charge samples from laser light reflected off different points of the object.

4. The CW-ToF camera system of claim 3, wherein the first set of charge samples is acquired from a first subset of the plurality of imaging pixels of the imaging sensor and the second set of charge samples is acquired from a second subset of the plurality of imaging pixels of the imaging sensor.

5. The CW-ToF camera system of claim 1, wherein the one or more imaging sensors are positioned substantially above the object.

6. The CW-ToF camera system of claim 1, wherein the first angle and the second angle are different.

7. The CW-ToF camera system of claim 1, wherein the object is a moving object, wherein the object is a substantially shaped as a cube, cuboid, box or cylinder and/or wherein the first surface of the object is substantially flat surface.

8. The CW-ToF camera system of claim 7, wherein the first set of charge samples are acquired from a first imaging sensor at a first time and the second set of charge samples are acquired from the first imaging sensor at a second time, and wherein the linear distance between the moving object at the first time and at the second time is known.

9. The CW-ToF camera system of claim 1, wherein the CW-ToF camera system comprises at least two imaging sensors and a relative location between the at least two imaging sensors is known, and wherein the first set of charge samples are acquired from a first imaging sensor at a first time and the second set of charge samples are acquired from a second imaging sensor at the first time.

10. The CW-ToF camera system of claim 1, wherein the distance determination system is configured to:

determine a relative phase between the outputted laser light and the reflected laser light received at the one or more imaging sensors when the first set of charge samples is acquired at the first angle;

determine a first plurality of candidate distances of the object from the one or more imaging sensors at the first angle based on the relative phase and an ambiguity interval of the first modulation signal;

determine a relative phase between the outputted laser light and the reflected laser light received at the one or more imaging sensors when the second set of charge samples is acquired at the second angle; and determine a second plurality of candidate distances of the object from the one or more imaging sensors at the second angle based on the relative phase and an ambiguity interval of the first modulation signal.

11. The CW-ToF camera system of claim 10, wherein the distance determination system is further configured to:

determine a first plurality of candidate sizes of the object based on the first plurality of candidate distances of the first surface the object from the one or more imaging sensors, the predetermined distance between the one or more imaging sensors and the second surface of the object, and an angle between the second surface of the object and a normal to a plane of the one or more imaging sensors; and determine a second plurality of candidate sizes of the object based on the second plurality of candidate distances of the first surface the object from the one or more imaging sensors, the predetermined distance between the one or more imaging sensors and the second surface of the object, and an angle between the second surface of the object and a normal to a plane of the one or more imaging sensors;

identify a first value from the first plurality of candidate sizes and a second value from the second plurality of candidate sizes that are substantially the same; and determine the size of the object at least by averaging the first value and the second value.

12. A method of operating a continuous wave time of flight, CW-ToF, camera system for imaging a first surface of an object, the method comprising:

acquiring a first set of charge samples from one or more imaging sensors in respect of the object by:

a) driving one or more lasers to output laser light modulated with a first modulation signal, wherein the first modulation signal has a first frequency; and b) after step a, reading out image sensor values indicative of charge accumulated by at least some of the plurality of imaging pixels of the one or more imaging sensors as a result of laser light reflected off a first surface of the object;

acquiring a second set of charge samples from the one or more imaging sensors in respect of the object by:

c) driving the one or more lasers to output laser light modulated with the first modulation signal; and d after step c, reading out image sensor values indicative of charge accumulated by at least some of the plurality of imaging pixels of the one or more imaging sensor as a result of laser light reflected off the first surface of the object; and determining, by a distance determination system coupled to the one or more imaging sensors, a size of the object, wherein the size is a distance between the first surface and a second surface of the object, based on the first set of charge samples acquired at a first angle relative to the first surface and the second set of charge samples acquired at a second angle relative to the second surface, the first angle, the second angle, and a predetermined distance between the one or more imaging sensors and the second surface of the object, wherein the first angle and the second angle are different.

13. The method of claim 12, wherein determining the size of the object comprises:

determining a relative phase between the outputted laser light and the reflected laser light received at the one or more imaging sensors when the first set of charge samples is acquired at the first angle;

determining a first plurality of candidate distances of the object from the one or more imaging sensors at the first angle based on the relative phase and an ambiguity interval of the first modulation signal;

determining a relative phase between the outputted laser light and the reflected laser light received at the one or more imaging sensors when the second set of charge samples is acquired at the second angle; and determining a second plurality of candidate distances of the object from the one or more imaging sensors at the second angle based on the relative phase and an ambiguity interval of the first modulation signal.

14. The method of claim 13, further comprising:

determining a first plurality of candidate sizes of the object based on the first plurality of candidate distances of the first surface the object from the one or more imaging sensors, the predetermined distance between the one or more imaging sensors and the second surface of the object, and an angle between the second surface of the object and a normal to a plane of the one or more imaging sensors; and determining a second plurality of candidate sizes of the object based on the second plurality of candidate distances of the first surface the object from the one or more imaging sensors, the predetermined distance between the one or more imaging sensors and the second surface of the object, and an angle between the second surface of the object and a normal to a plane of the one or more imaging sensors;

identifying a first value from the first plurality of candidate sizes and a second value from the second plurality of candidate sizes that are substantially the same; and determining the size of the object at least by averaging the first value and the second value.

15. A continuous wave time of flight, CW-ToF, camera system comprising:

a laser for outputting laser light;

an imaging sensor comprising a plurality of imaging pixels for accumulating charge based on incident light comprising reflected laser light off a first surface of a moving object; and a distance determination system coupled to the imaging sensor and configured to:

acquire a first set of charge samples from the imaging sensor in respect of a moving object at a first time by:

a) driving the laser to output laser light modulated with a first modulation signal, wherein the first modulation signal has a first frequency; and b) after step a, reading out image sensor values indicative of charge accumulated by at least some of the plurality of imaging pixels of the imaging sensor;

acquire a second set of charge samples from the imaging sensor in respect of the moving object at a second time by:

c) driving the laser to output laser light modulated with the first modulation signal; and d) after step c, reading out image sensor values indicative of charge accumulated by at least some of the plurality of imaging pixels of the imaging sensor; and determine by a distance determination system coupled to the imaging sensor, a size of the moving object, wherein the size is a distance between the first surface and a second surface of the moving object, based on the first set of charge samples acquired at a first angle relative to the first surface and the second set of charge samples acquired at a second angle relative to the second surface, the first angle, the second angle, and a predetermined distance between the imaging sensor and the second surface of the moving object, wherein the first angle and the second angle are different.

16. A method of operating a continuous wave time of flight, CW-ToF, camera system for imaging a first surface of a moving object, the method comprising:

acquiring a first set of charge samples from an imaging sensor in respect of the moving object at a first time by:

a) driving a laser to output laser light modulated with a first modulation signal, wherein the first modulation signal has a first frequency; and b) after step a, reading out image sensor values indicative of charge accumulated by at least some of the plurality of imaging pixels of the imaging sensor as a result of laser light reflected off the first surface of the object;

acquiring a second set of charge samples from the imaging sensor in respect of the moving object at a second time by:

c) driving the laser to output laser light modulated with the first modulation signal; and d) after step c, reading out image sensor values indicative of charge accumulated by at least some of the plurality of imaging pixels of the imaging sensor as a result of laser light reflected off the first surface of the moving object; and determining, by a distance determination system coupled to the imaging sensor, a size of the moving object, wherein the size is a distance between the first surface and a second surface of the moving object, based on the first set of charge samples acquired at a first angle relative to the first surface and the second set of charge samples acquired at a second angle relative to the second surface, the first angle, the second angle, and a predetermined distance between the imaging sensor and the second surface of the moving object, wherein the first angle and the second angle are different.

17. A continuous wave time of flight, CW-ToF, camera system comprising:

at least a first and a second laser for outputting laser light;

at least a first and a second imaging sensor, the at least two imaging sensors each comprising a plurality of imaging pixels for accumulating charge based on incident light comprising reflected laser light off a first surface of an object; and a distance determination system coupled to the first and second imaging sensors and configured to:

acquire a first set of charge samples from the at least two imaging sensors in respect of the object at a first time by:

a) driving a first laser to output laser light modulated with a first modulation signal, wherein the first modulation signal has a first frequency; and b) after step a, reading out image sensor values indicative of charge accumulated by at least some of the plurality of imaging pixels of the first imaging sensor;

acquire a second set of charge samples from the at least two imaging sensors in respect of the object at the first time by:

c) driving a second laser to output laser light modulated with the first modulation signal; and d) after step c, reading out image sensor values indicative of charge accumulated by at least some of the plurality of imaging pixels of the second imaging sensor; and determine a size of the object, wherein the size is a distance between the first surface and a second surface of the object, based on the first set of charge samples acquired at a first angle relative to the first surface and the second set of charge samples acquired at a second angle relative to the second surface, the first angle, the second angle, and a predetermined distance between the first and second imaging sensors and the second surface of the object, wherein the first angle and the second angle are different.

18. A method of operating a continuous wave time of flight, CW-ToF, camera system for imaging a first surface of an object, the method comprising:

acquiring a first set of charge samples from a first imaging sensor in respect of the object by:

a) driving a first laser to output laser light modulated with a first modulation signal, wherein the first modulation signal has a first frequency; and b) after step a, reading out image sensor values indicative of charge accumulated by at least some of the plurality of imaging pixels of the first imaging sensor as a result of laser light reflected off first surface of the object;

acquiring a second set of charge samples from a second imaging sensor in respect of the object by:

c) driving a second laser to output laser light modulated with the first modulation signal; and d) after step c, reading out image sensor values indicative of charge accumulated by at least some of the plurality of imaging pixels of the second imaging sensor as a result of laser light reflected off the first surface of the object; and determining, by a distance determination system coupled to the first and second imaging sensors, a size of the object, wherein the size is a distance between the first surface and a second surface of the object, based on the first set of charge samples acquired at a first angle relative to the first surface and the second set of charge samples acquired at a second angle relative to the second surface, the first angle, the second angle and a predetermined distance between the first and second imaging sensors and the second surface of the object, wherein the first angle and the second angle are different.

19. A continuous wave time of flight, CW-ToF, camera system comprising:

a laser for outputting laser light;

an imaging sensor, the imaging sensor comprising a plurality of imaging pixels for accumulating charge based on incident light comprising reflected laser light off a first surface of an object; and a distance determination system coupled to the imaging sensor and configured to:

acquire a first set of charge samples from a first subset of the plurality of imaging pixels of the imaging sensor in respect of the object at a first time by:

a) driving a first laser to output laser light modulated with a first modulation signal, wherein the first modulation signal has a first frequency; and b) after step a, reading out image sensor values indicative of charge accumulated by the first subset of the plurality of imaging pixels of the imaging sensor;

acquire a second set of charge samples from a second subset of the plurality of imaging pixels of the imaging sensor in respect of the object at the first time by:

c) driving a second laser to output laser light modulated with the first modulation signal; and d) after step c, reading out image sensor values indicative of charge accumulated by the second subset of imaging pixels of the imaging sensor; and determine a size of the object, wherein the size is a distance between the first surface and a second surface of the object, based on the first set of charge samples acquired at a first angle relative to the first surface and the second set of charge samples acquired at a second angle relative to the second surface, the first angle, the second angle, and a predetermined distance between the imaging sensor and the second surface of the object, wherein the first angle and the second angle are different.

20. A method of operating a continuous wave time of flight, CW-ToF, camera system for imaging a first surface of an object, the method comprising:

acquiring a first set of charge samples from a first subset of the plurality of imaging pixels of the imaging sensor in respect of the object at a first time by:

a) driving a first laser to output laser light modulated with a first modulation signal, wherein the first modulation signal has a first frequency; and b) after step a, reading out image sensor values indicative of charge accumulated by the first subset of the plurality of imaging pixels of the imaging sensor;

acquiring a second set of charge samples from a second subset of the plurality of imaging pixels of the imaging sensor in respect of the object at the first time by:

c) driving a second laser to output laser light modulated with the first modulation signal; and d) after step c, reading out image sensor values indicative of charge accumulated by the second subset of imaging pixels of the imaging sensor; and determining a size of the object, wherein the size is a distance between the first surface and a second surface of the object, based on the first set of charge samples acquired at a first angle relative to the first surface and the second set of charge samples acquired at a second angle relative to the second surface, the first angle, the second angle, and a predetermined distance between the imaging sensor and the second surface of the object, wherein the first angle and the second angle are different.

* * * * *